US006914656B2

(12) United States Patent
Sakamoto et al.

(10) Patent No.: US 6,914,656 B2
(45) Date of Patent: Jul. 5, 2005

(54) SEMI-TRANSMISSIVE LIQUID CRYSTAL DISPLAY DEVICE

(75) Inventors: Michiaki Sakamoto, Kanagawa (JP); Makoto Watanabe, Kanagawa (JP); Shinichi Nishida, Kanagawa (JP)

(73) Assignees: NEC Corporation; NEC LCD Technologies, Ltd. (JP)

( * ) Notice: Subject to any disclaimer, the term of this patent is extended or adjusted under 35 U.S.C. 154(b) by 43 days.

(21) Appl. No.: 10/442,887

(22) Filed: May 21, 2003

(65) Prior Publication Data

US 2003/0218664 A1 Nov. 27, 2003

(30) Foreign Application Priority Data

May 24, 2002 (JP) ........................................ 2002-151291

(51) Int. Cl.[7] .................................................. G02F 1/1343
(52) U.S. Cl. ..................................... 349/141; 349/114
(58) Field of Search ..................................... 349/141, 114, 349/113

(56) References Cited

U.S. PATENT DOCUMENTS

| 6,583,840 | B1 | * | 6/2003 | Inoue et al. ................. 349/141 |
| 6,608,660 | B1 | * | 8/2003 | Okamoto et al. ........... 349/113 |
| 6,611,310 | B2 | * | 8/2003 | Kurahashi et al. .......... 349/141 |
| 2001/0048496 | A1 | | 12/2001 | Back | |
| 2001/0052948 | A1 | * | 12/2001 | Okamoto et al. ............. 349/12 |

FOREIGN PATENT DOCUMENTS

| JP | 11-167109 | 6/1999 |
| JP | 295277 | 7/1999 |
| JP | 2001-42316 | 2/2001 |
| JP | 2001-83494 | 3/2001 |
| JP | 2001-125096 | 5/2001 |

OTHER PUBLICATIONS

Office Action issued by the Taiwanese Patent Office on May 20, 2004 in connection with a corresponding Taiwanese patent application citing U.S. reference 2001–048496 A1.
English translation of rejection reasons in the Office Action issued by the Taiwanese Patent Office on May 20, 2004.
Abstract and claims for U.S. reference 2001–048496 A1 provided by esp@cenet database—Worldwide.

* cited by examiner

*Primary Examiner*—Kenneth Parker
(74) *Attorney, Agent, or Firm*—Ostrolenk, Faber, Gerb & Soffen, LLP

(57) ABSTRACT

In a semi-transmissive liquid crystal display device having a reflective region 5 and a transmissive region therein, a one-half wavelength plate 29 is disposed between a lower substrate 11 and a polarizer 21a provided on a side of the lower substrate. This makes liquid crystal molecules in at least the transmissive region 6 driven by a horizontal electric field and allows the device to operate in a normally-black mode in both the reflective region 5 and the transmissive region 6, realizing a semi-transmissive liquid crystal display device having wide viewing angle characteristics.

16 Claims, 20 Drawing Sheets

FIG. 4(a)    FIG. 4(b)
FIG. 4(c)
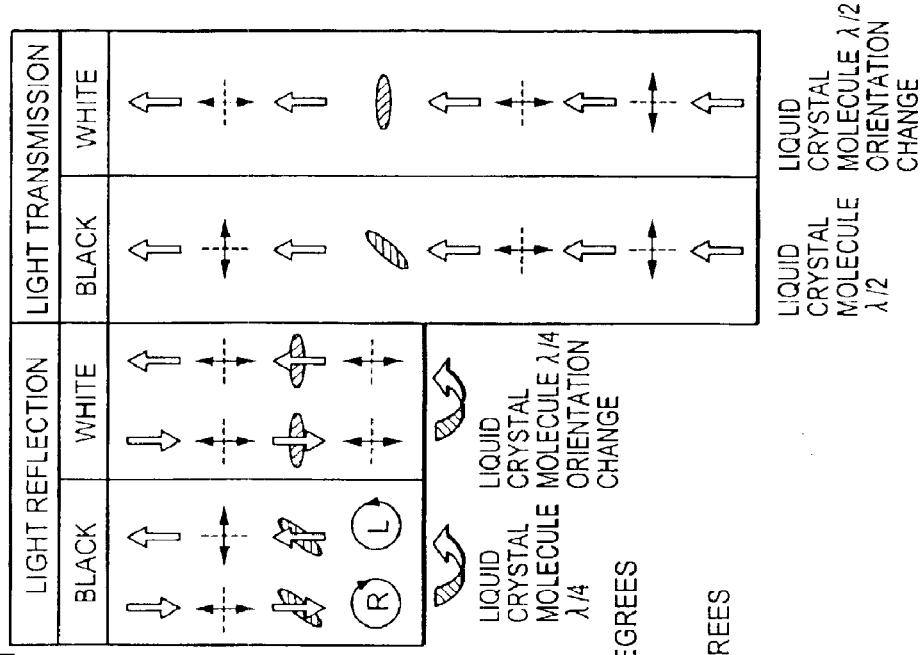
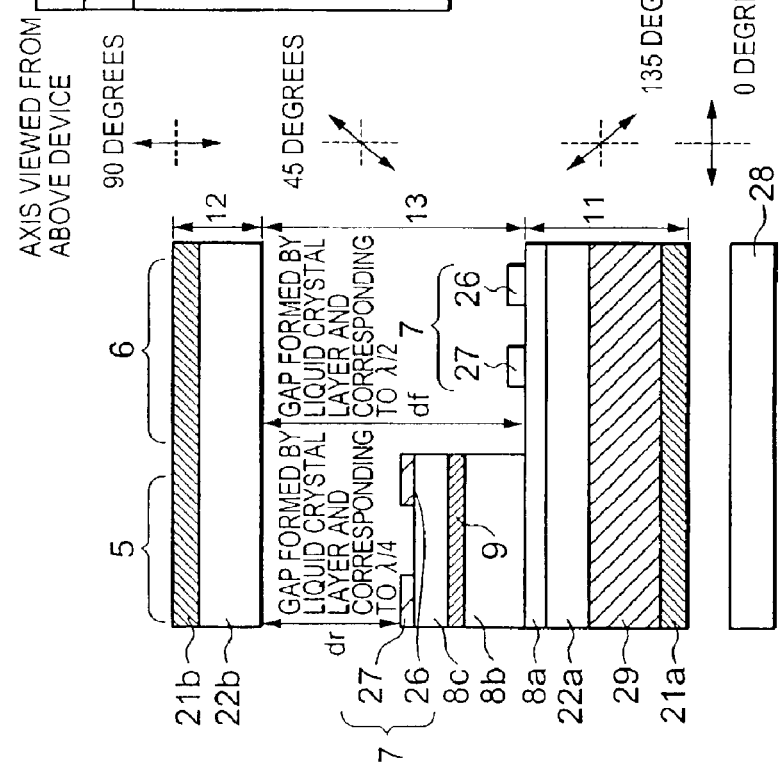

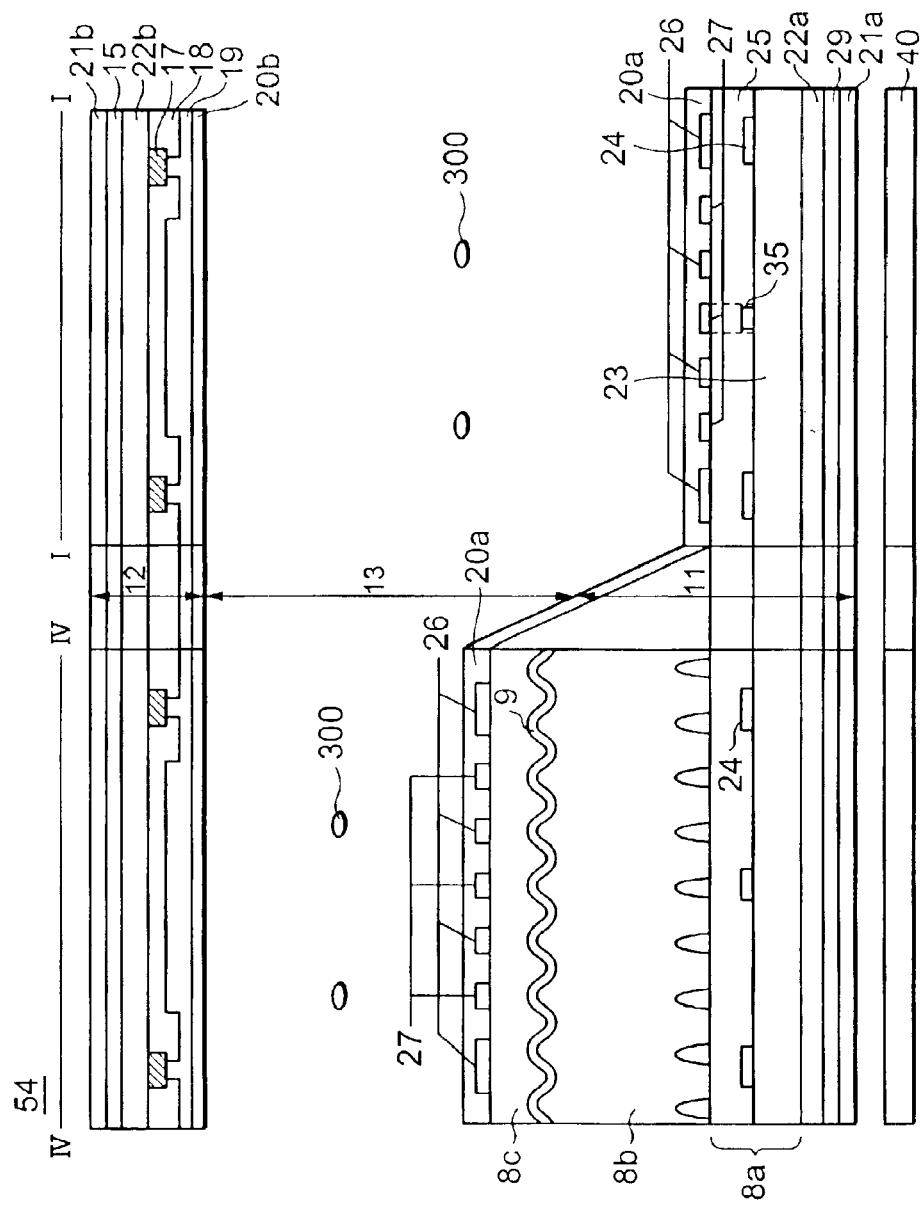

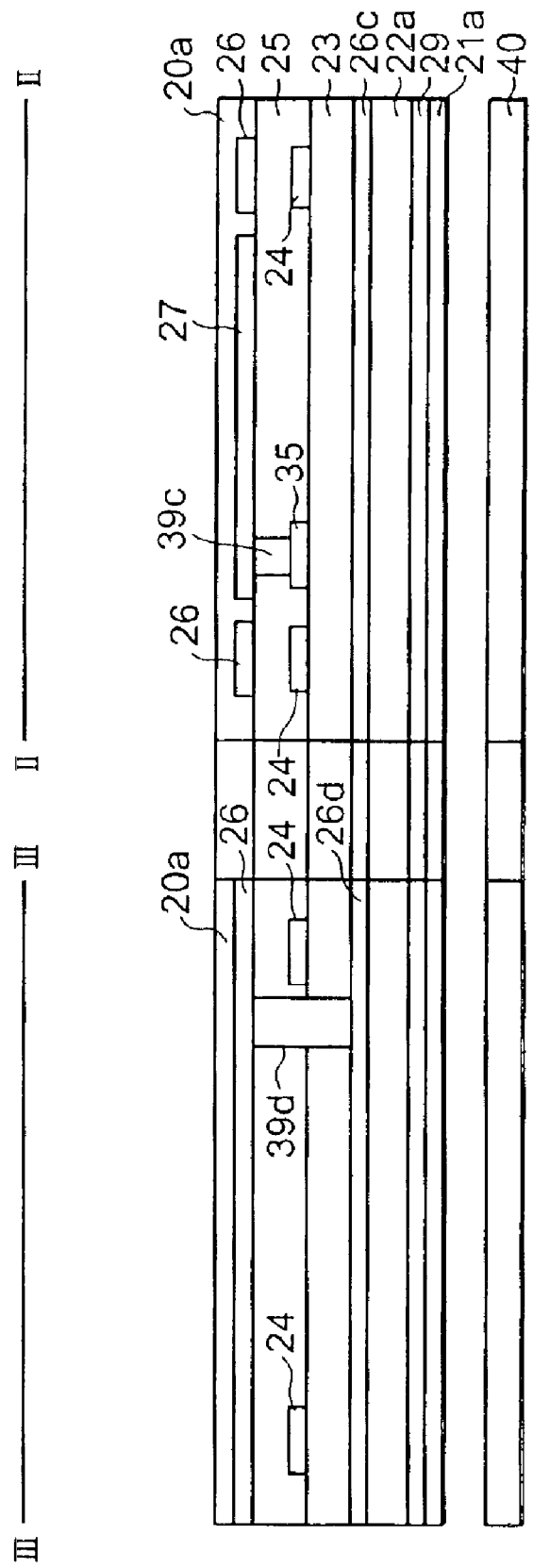

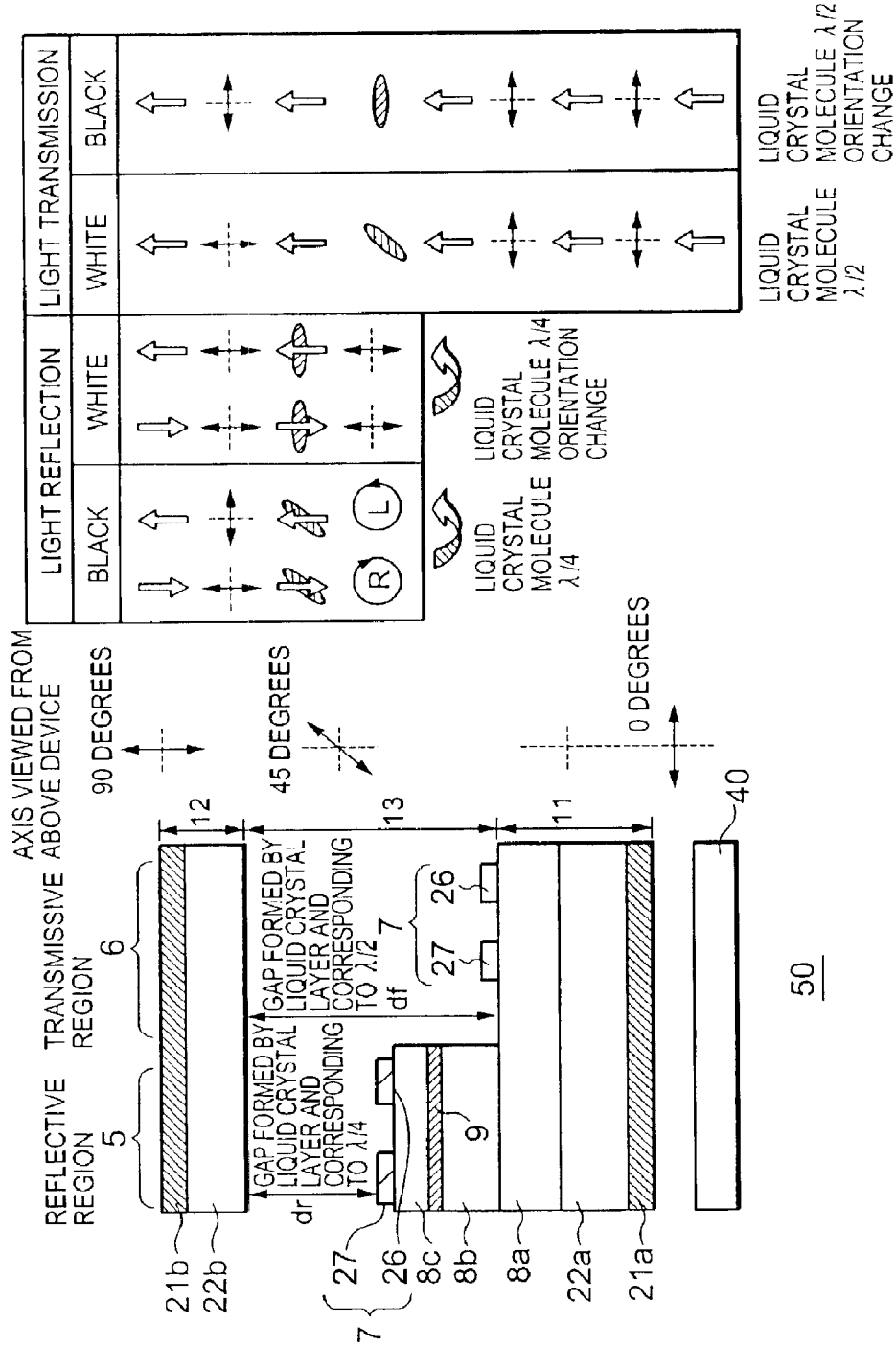

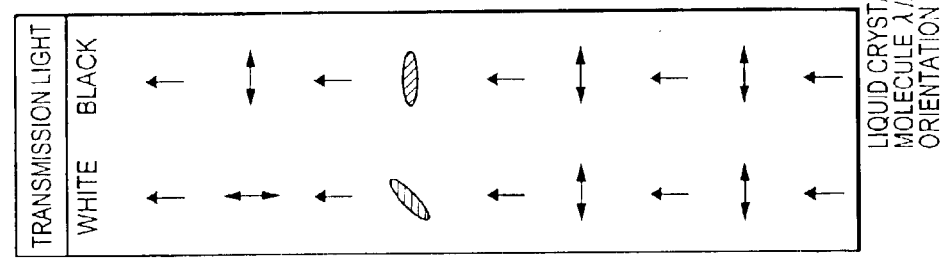
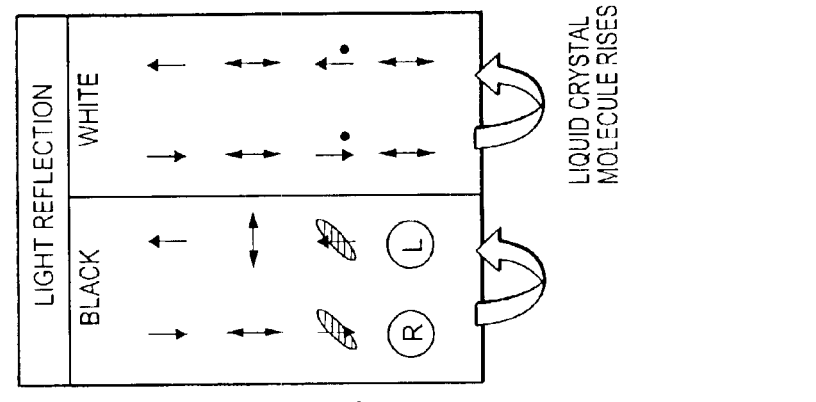
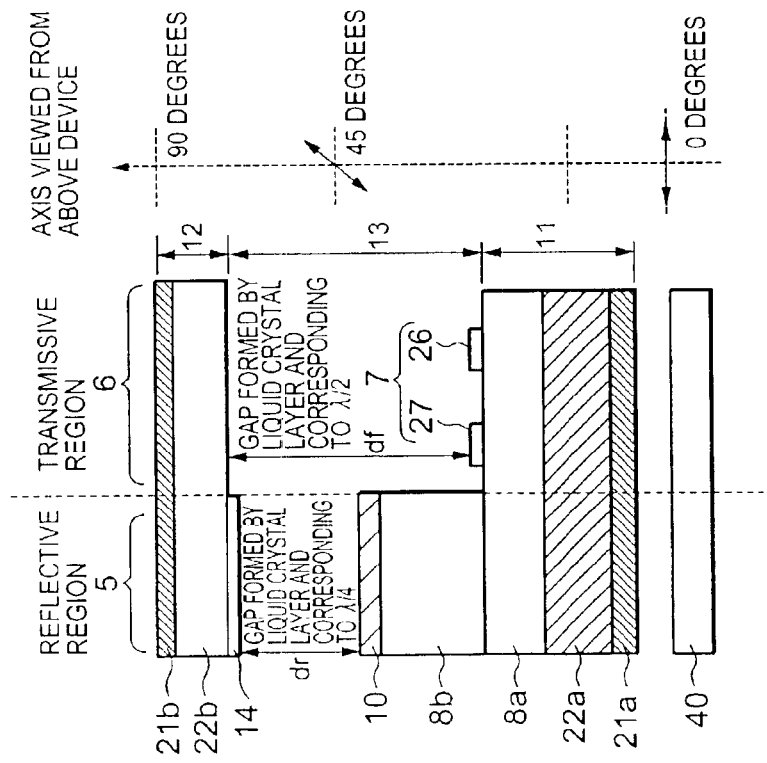

SEMI-TRANSMISSIVE LIQUID CRYSTAL DISPLAY DEVICE

BACKGROUND OF THE INVENTION

1. Field of the Invention

The present invention relates to a liquid crystal display device, and particularly to a semi-transmissive liquid crystal display device having a reflective region used to perform display functions by reflecting light incoming from outside and a transmissive region used to perform display functions by allowing light from a light source provided on the backside of the device to transmit through the transmissive region.

2. Description of the Related Art

Conventionally, two primary types of liquid crystal display devices have been known. One of the two primary devices is a reflective liquid crystal display device which includes a reflector within the device in order to reflect light incoming from outside and serving as a light source for display by using the reflector and eliminates the need for a backlight as a light source. The other is a transmissive liquid crystal display device having a backlight provided therein as a light source.

Since the reflective liquid crystal display device eliminates the need for a backlight, which is indispensable for formation of a transmissive liquid crystal display device, the reflective device consumes lower electric power and is fabricated thinner and lighter. Accordingly, the reflective liquid crystal display device is utilized primarily as a portable terminal device. In contrast, since the transmissive liquid crystal display device has a backlight therein as a light source, the device is advantageously able to clearly display an image to be viewed even when the amount of light from the surroundings is small, i. e., the surroundings are dark.

In consideration of features found in the two primary types of liquid crystal display devices, a semi-transmissive liquid crystal display device whose cross sectional view is shown in FIG. 19 is disclosed as a liquid crystal display device that has both advantages found respectively in the reflective liquid crystal display device and the transmissive liquid crystal display device and includes both a reflective region 5 and a transmissive region 6 in one pixel (refer to Japanese Patent No. 2955277). In the disclosed semi-transmissive liquid crystal display device, light travels different distances in a liquid crystal layer respectively when entering the reflective region 5 followed by reflection by the same and when transmitting through the transmissive region 6. That is, light travels back and forth within the liquid crystal layer in the reflective region 5 and travels only one time through the liquid crystal layer in the transmissive region 6. To prevent occurrence of the difference in distances that light travels in the liquid crystal layer, the liquid crystal display device shown in FIG. 19 is configured to have an insulation layer 8 formed below a transparent electrode 7 in the reflective region 5 and dispose a reflector 9 below the insulation layer 8, causing a difference between a thickness dr of the liquid crystal layer in the reflective region 5 and a thickness df of the liquid crystal layer in the transmissive region 6. Accordingly, the difference therebetween gives solution to a problem of impossibility of optimizing the intensity of light exiting the device, which problem is due to different retardation values that both regions have.

As described above, forming the transmissive region and the reflective region in a pixel electrode makes it possible to use a liquid crystal display device as a reflective liquid crystal display device by turning off a backlight when the surroundings are bright, thereby effecting low power consumption that is to be achieved by employment of a reflective liquid crystal display device. Furthermore, in a case where a liquid crystal display device is used as a transmissive liquid crystal display device when the surroundings are dark and the backlight is turned on, the liquid crystal display device enhances the visibility of an image to be displayed when the surroundings are dark, which operation is featured in a transmissive liquid crystal display device.

A liquid crystal display device can also be grouped into two primary devices in terms of its operation. That is, one of the primary devices called a vertical electric field type is configured to perform display functions by making a liquid crystal molecule whose major axis is previously aligned in a predetermined direction (referred to as a director) rotate in a plane perpendicular to a substrate and the other called a horizontal electric field type is configured to perform display functions by making the liquid crystal molecule rotate in a plane parallel to a substrate.

A vertical electric field type transmissive liquid crystal display device has worse viewing angle characteristics as compared to a horizontal electric field type transmissive liquid crystal display device. However, in a reflective region to which a vertical electric field is applied, light incident on the region and light reflected from the region travel in directions reverse to each other relative to a direction (direction of optical axis) of the principal indices of refraction of a liquid crystal molecule, in other words, travel in a direction substantially symmetrical relative thereto. Accordingly, the amount of birefringence of the area irradiated by the light incident on the region and the amount of birefringence of the area irradiated by the light reflected from the region are cancelled each other to reduce the amount of change in the birefringence, achieving desirable viewing angle characteristics.

In order to further improve the viewing angle characteristics of the semi-transmissive liquid crystal display device, a technique that employs a transmissive region to which a horizontal electric field is applied has been proposed (Japanese Patent Application Laid-open No. 2001-042316, Japanese Patent Application Laid-open No. 2001-083494, Japanese Patent Application Laid-open No. 2001-125096, Japanese Patent Application Laid-open No. Hei 11-167109).

The inventors of the application found that when the semi-transmissive liquid crystal display device shown in FIG. 19 employs a horizontal electric field, the device operates in a normally-white mode in the reflective region 5 and in a normally-black mode in the transmissive region 6, meaning the device is far from serving as a practical usage. How the device operates will be explained in detail below with reference to the drawings.

FIGS. 20(*a*), 20(*b*) and 20(*c*) are schematic diagrams of the semi-transmissive liquid crystal display device shown in FIG. 19 and having therein both the reflective region 5 and the transmissive region 6 to which a horizontal electric field is applied. In particular, FIG. 20(a) illustrates how the associated components are optically arranged and FIG. 20(b) illustrates an alignment angle at which a polarizer and a liquid crystal layer are oriented relative to each other when viewing the device from the side of an opposing substrate 12, and FIG. 20(c) illustrates how the polarizer and the liquid crystal layer operate in the reflective and transmissive regions.

As shown in FIG. 20(a), a semi-transmissive liquid crystal display device 50 includes: a lower substrate 11; an opposing substrate 12; a liquid crystal layer 13 sandwiched between the two substrates; and a backlight 40 disposed below the lower substrate 11, in which the lower substrate 11 and the opposing substrate 12 have polarizers 21a and 21b provided respectively on the outer sides of the substrates. Though not shown in FIG. 20(a) for simplification, the lower substrate 11 and the opposing substrate 12 have horizontal alignment films for aligning liquid crystal molecules in a horizontal direction provided respectively on surfaces, contacting the liquid crystal layer 13, of the substrates. An angle made between the two alignment films, provided on the surfaces of the two substrates, for aligning liquid crystal molecules in a horizontal direction is referred to as a twist angle.

The lower substrate 11 has a first insulation film 8a provided on a side, facing the liquid crystal layer 13, of the substrate 11. In a reflective region 5, the lower substrate 11 has a second insulation film 8b formed on the first insulation film 8a and a reflector 9 formed on the second insulation film 8b, and then, a third insulation film 8c formed on the reflector 9, and further, an electrode 7 for generation of horizontal electric field formed on the third insulation film 8c. The electrode 7 for generation of horizontal electric field consists of a pixel electrode 27 and a common electrode 26 disposed in parallel with each other, and an electric field generated between the pixel electrode 27 and the common electrode 26 drives the liquid crystal layer 13. In a transmissive region 6, the lower substrate 11 has a pixel electrode 27 and a common electrode 26 formed on the first insulation film 8a and disposed in parallel with each other, and an electric field generated between the pixel electrode 27 and the common electrode 26 drives the liquid crystal layer 13. The second insulation film 8b and the third insulation film 8c are provided to adjust a difference between gaps formed by thicknesses of the liquid crystal layer 13 in the transmissive region 6 and the reflective region 5.

As shown in FIG. 20(b), when a voltage is not applied between the common electrode 26 and the pixel electrode 27, and an alignment angle at which the polarizer 21a located on a lower side of the reflective region 5 and the transmissive region 6 is oriented is assumed to be zero, the polarizer 21b located facing the polarizer 21a is made to have an alignment angle of 90 degrees and the liquid crystal layer 13 is made to have an alignment angle of 45 degrees.

How the semi-transmissive liquid crystal display device operates under the aforementioned conditions is shown in FIG. 20(c). The device operates in the reflective region 5 as follows. When a voltage is not applied between the pixel electrode 27 and the common electrode 26, linearly polarized light having transmitted through the polarizer 21b and having an alignment angle of 90 degrees transmits through the liquid crystal layer 13 and then becomes right circularly polarized light. Thereafter, the right circularly polarized light reaches the reflector 9 and is reflected as left circularly polarized light by the reflector 9, and again transmits through the liquid crystal layer 13 and becomes linearly polarized light having an alignment angle of 0 degrees, preventing the light from exiting the device and in turn being followed by a display of black color. When a voltage is applied between the pixel electrode 27 and the common electrode 26, the liquid crystal layer 13 changes its state and comes to have an alignment angle of 0 degrees. In this case, the linearly polarized light having transmitted through the polarizer 21b and having an alignment angle of 90 degrees keeps unchanged even after transmission through the liquid crystal layer 13. Then, the light reaches the reflector 9 and is reflected by the reflector 9, and again transmits through the liquid crystal layer 13 and exits the device while keeping its linearly polarized state and having an alignment angle of 90 degrees, leading to a display of white color. That is, the device operates in a normally-black mode in the reflective region 5.

The device operates in the transmissive region 6 as follows. When a voltage is not applied to the liquid crystal layer 13, linearly polarized light having transmitted through the polarizer 21a (and having an alignment angle of 0 degrees) transmits through the liquid crystal layer 13 and then becomes linearly polarized light having an alignment angle of 90 degrees. Thereafter, the linearly polarized light exits the polarizer 21b having an alignment angle of 90 degrees, leading to a display of white color. When a voltage is applied to the liquid crystal layer 13, the liquid crystal layer 13 changes its state and comes to have an alignment angle of 0 degrees. In this case, the linearly polarized light having transmitted through the polarizer 21a (and having an alignment angle of 0 degrees) keeps unchanged even after transmission through the liquid crystal layer 13 and then does not exit the polarizer 21b having an alignment angle of 90 degrees, leading to a display of black color. That is, the device operates in a normally-white mode in the transmissive region 6.

Subsequently, how a semi-transmissive liquid crystal display device 51 having a reflective region 5 to which a vertical electric field is applied and a transmissive region 6 to which a horizontal electric field is applied operates will be explained below. FIG. 21(a) illustrates how the associated components are optically arranged in the semi-transmissive liquid crystal display device 51 and FIG. 21(b) illustrates an alignment angle at which a polarizer and a liquid crystal layer are oriented relative to each other when viewing the device from the side of an opposing substrate 12, and FIG. 20(c) illustrates how the polarizer and the liquid crystal layer operate in the reflective and transmissive regions.

The difference between the optical arrangement applied to the reflective region 5 shown in FIG. 21(a) and the optical arrangement applied to the reflective region 5 shown in FIG. 20(a) is that the device shown in FIG. 21(a) does not have the reflector 9 and the electrode 7 for generation of horizontal electric field, those components being provided in the device shown in FIG. 20(a), and instead, has a reflecting pixel electrode 10 formed on a second insulation film 8b and an opposing electrode 14 formed on an opposing substrate 12 so as to face the reflecting pixel electrode 10. The device shown in FIG. 21(a) is configured to generate a vertical electric field between the reflecting pixel electrode 10 and the opposing electrode 14 in the reflective region 5. Note that the optical arrangement applied to the transmissive region 6 shown in FIG. 21(a) is the same as that applied to the transmissive region 6 shown in FIG. 20(a). Furthermore, when viewing the device from the side of the opposing substrate 12, a polarizer and a liquid crystal layer shown in FIG. 21(b) have the same alignment angles as those shown respectively in FIG. 21(b), and therefore, the explanation of the optical arrangement and the alignment angles shown in FIGS. 21(a), 21(b) is omitted.

How the semi-transmissive liquid crystal display device 51 constructed in the aforementioned manner operates in the reflective region 5 will be explained with reference to FIG. 21(c). When a voltage is not applied between the reflecting pixel electrode 10 and the opposing electrode 14, linearly polarized light having transmitted through a polarizer 21b and having an alignment angle of 90 degrees transmits through a liquid crystal layer 13 and then becomes right circularly polarized light. Thereafter, the right circularly polarized light reaches a reflecting pixel electrode 10 and is reflected as left circularly polarized light by the reflecting pixel electrode 10, and again transmits through the liquid crystal layer 13 and becomes linearly polarized light having an alignment angle of 0 degrees, preventing the light from exiting the device and in turn being followed by a display of black color. When a voltage is applied between the reflecting pixel electrode 10 and the opposing electrode 14, a liquid crystal molecule of the liquid crystal layer 13 vertically rises. In this case, the linearly polarized light having transmitted through the polarizer 21b and having an alignment angle of 90 degrees keeps unchanged even after transmission through the liquid crystal layer 13. Then, the light reaches the reflecting pixel electrode 10 and is reflected by the reflecting pixel electrode 10, and again transmits through the liquid crystal layer 13 and exits the device while keeping its linearly polarized state and having an alignment angle of 90 degrees, leading to a display of white color. That is, the device operates in a normally-black mode in the reflective region 5. Since how the device operates in the transmissive region 6 is the same as that explained in the description of the device shown in FIG. 20(c), the explanation thereof is omitted. However, it can be concluded that the device operates in a normally-white mode in the transmissive region 6.

As noted above, when liquid crystal molecules in the transmissive region 6 are driven by a horizontal electric field and in addition, even when liquid crystal molecules in the reflective region 5 are driven by either a horizontal electric field or a vertical electric field, the device operates in a normally-black mode in the reflective region 5 and operates in a normally-white mode in the transmissive region 6, meaning the device is far from serving as a practical usage. If one tries to force the device to display images, one has to make polarity of an image signal input to the reflective region and polarity of an image signal input to the transmissive region opposite to each other, causing significant difficulty in designing a device structure and processing a signal.

SUMMARY OF THE INVENTION

An object of the invention is to provide a semi-transmissive liquid crystal display device that exhibits further improved viewing angle characteristics while displaying desired images.

A semi-transmissive liquid crystal display device according to the invention is constructed such that liquid crystal molecules in at least a transmissive region are driven by a horizontal electric field and a one-half wavelength plate is provided on a side opposite a liquid crystal layer relative to electrodes used to generate a horizontal electric field in order to drive the liquid crystal molecules in the transmissive region.

By providing the one-half wavelength plate in the aforementioned manner, an alignment angle at which linearly polarized light is oriented is made to rotate 90 degrees in the transmissive region, allowing the device to change its display mode from normally-white mode to normally-black mode. Accordingly, the device is able to operate in a normally-black mode in both the transmissive region and the reflective region, and thus, a semi-transmissive liquid crystal display device having wide viewing angle characteristics can be provided without through any intentional design of a device structure or without employing any particular signal processing scheme. Note that the one-half wavelength plate utilized herein means a component that is just able to make the alignment angle at which linearly polarized light is oriented rotate about 90 degrees. That is, by adjusting an alignment angle, at which the liquid crystal layer, the polarizer and the one-half wavelength plate are oriented relative to one another, the invention is able to employ even a one-half wavelength plate that makes the alignment angle, at which linearly polarized light is oriented, rotate 90±30 degrees.

In the aforementioned device, liquid crystal molecules in the reflective region may be driven by either a vertical electric field or a horizontal electric field. Preferably, twist angles in the reflective region and the transmissive region are approximately the same. This is because the intensity of reflected light and the intensity of transmission light change with a twist angle in the same fashion.

As will be clarified by the later description of embodiments, the device is preferably constructed so that the reflective region has a reflector formed therein and the reflector is formed in a level positioned nearer an alignment film on a side of the opposing substrate than an alignment film formed in the transmissive region and located on a side of the lower substrate.

This makes it possible to form almost all films through the same process steps in order to have the same film configuration in the reflective region and the transmissive region.

The semi-transmissive liquid crystal display device is characterized in that electrodes used to generate a horizontal electric field and drive liquid crystal molecules with the horizontal electric field in the reflective region are transparent electrodes and formed in the reflective region. Forming the electrodes as a transparent electrode used to generate a horizontal electric field and drive liquid crystal molecules with the horizontal electric field in the reflective region allows the device to increase its effective aperture ratio.

In the semi-transmissive liquid crystal display device having liquid crystal molecules driven by a horizontal electric field in both the reflective and transmissive regions, a one-half wavelength plate is provided at least on an area corresponding to the transmissive region and the reflective region has at least one of a common electrode used to supply a reference potential and a pixel electrode corresponding to a pixel to be displayed, and liquid crystal molecules in the transmissive region are driven by a horizontal electric field generated by the common electrode and/or the pixel electrode.

Since the invented device is constructed so that liquid crystal molecules in the transmissive region are driven by a horizontal electric field created in the reflective region, the number of electrodes used to generate a horizontal electric field and formed in the transmissive region can be reduced or electrodes used to generate a horizontal electric field may not be formed in the transmissive region, allowing for increase in the aperture ratio of the transmissive region.

Furthermore, the invented device is characterized in that the common electrode or the common electrode formed in the reflective region is a reflecting electrode. Forming electrodes as a reflecting electrode used to generate a horizontal electric field in the reflective region allows the effective aperture ratio of the reflective region to increase up to about 100%.

In the invented device, preferably the reflecting common electrode is a reflecting electrode and formed in a level positioned nearer a liquid crystal layer than a data line and the data line is covered through an insulation film with the reflecting common electrode formed wider than the data line. Furthermore, preferably the reflecting common electrode is formed in a level positioned nearer a liquid crystal layer than a scanning line and the scanning line is covered through an insulation film with the reflecting common electrode formed wider than the scanning line.

Forming the reflecting common electrode in the aforementioned manner makes it possible to shield leakage electric fields from the data line and the scanning line, enlarging an effective display area that can be controlled by an electric field between the pixel electrode and the common electrode and then increasing the aperture ratio of the device. In addition, since the reflecting common electrode is formed in the reflective region, the effective aperture ratio of the device becomes nearly 100%.

In the invented device, preferably the reflecting common electrode is formed in a level positioned nearer a liquid crystal layer than a channel region of a thin film transistor and the channel region is completely covered through an insulation film with the reflecting common electrode.

Forming the reflecting common electrode in the aforementioned manner makes it possible to shield an electromagnetic field toward the TFT 30 from outside, increasing the stability of the characteristics of TFT and then increasing the reliability of an image to be displayed.

Preferably, the common electrode is connected to a common electrode interconnect line made of an opaque metal through a contact hole in each pixel and the pixel electrode is connected to an auxiliary pixel electrode made of an opaque metal through a contact hole in each pixel.

Connecting the common electrode to the common electrode interconnect line via the contact hole in each pixel reduces the resistance of the common electrode while enhancing a redundancy of the common electrode.

Preferably, both the common electrode and the pixel electrode are formed at the same level of interconnect. Forming the common electrode and the pixel electrode at the same level of interconnect makes it possible to form the common electrode and the pixel electrode through the same process step and by using the same material, leading to increase in manufacturing efficiency.

Preferably, the common electrode interconnect line and the auxiliary pixel electrode are formed to overlap each other while sandwiching an insulation film therebetween. Forming the common electrode interconnect line and the auxiliary pixel electrode in the aforementioned manner allows formation of an additional accumulation capacitance, increasing the accumulation capacitance of the device and stabilizing an image to be displayed.

Preferably, at least a part of the auxiliary pixel electrode is formed below the pixel electrode formed at the same level as the common electrode and in a comb shape. Since a vertical electric field is applied to liquid crystal molecules just above the transparent pixel electrode, the molecules are made to rise up, reducing transmittance through the transparent pixel electrode as compared to the transmittance through an area between the comb-shaped electrodes. Accordingly, disposing the auxiliary pixel electrode made from an opaque material just below the pixel electrode having relatively low transmittance allows physical and electrical connection between the pixel electrode and the auxiliary pixel electrodes on both sides of a pixel without significant reduction in efficiency of light utilization.

BRIEF DESCRIPTION OF THE DRAWINGS

FIG. 4(a) is a cross sectional view illustrating how components constituting a cell of a semi-transmissive liquid crystal display device of a second embodiment are optically arranged;

FIG. 4(b) illustrates an alignment angle at which the components are oriented relative to one another;

FIG. 4(c) illustrates how the components operate in the reflective and transmissive regions;

FIG. 8(a) is a cross sectional view taken along line I—I of FIGS. 5, 6, 7;

FIG. 8(b) is a cross sectional view taken along line IV—IV of FIGS. 5, 6, 7;

FIG. 9(a) is a cross sectional view taken along line II—II of FIGS. 5, 6, 7;

FIG. 9(b) is a cross sectional view taken along line III—III of FIGS. 5, 6, 7;

FIG. 20(a) is a cross sectional view illustrating how components constituting a cell of a first conventional semi-transmissive liquid crystal display device are optically arranged;

FIG. 20(b) illustrates an alignment angle at which the components each are oriented relative to one another;

FIG. 20(c) illustrates how the components operate in the reflective and transmissive regions;

FIG. 21(a) is a cross sectional view illustrating how components constituting a cell of a second conventional semi-transmissive liquid crystal display device are optically arranged;

FIG. 21(b) illustrates an alignment angle at which the components each are oriented relative to one another; and FIG. 21(c) illustrates how the components operate in the reflective and transmissive regions.

DETAILED DESCRIPTION OF THE PREFERRED EMBODIMENTS

Although preferred embodiments of the invention will be explained below with reference to the accompanying drawings, one ordinary skilled in the art to which the invention pertains will appreciate that the invention is not limited to the following embodiments and various modifications and enhancements may be made in the embodiments.

(First Embodiment)

Figure 1:
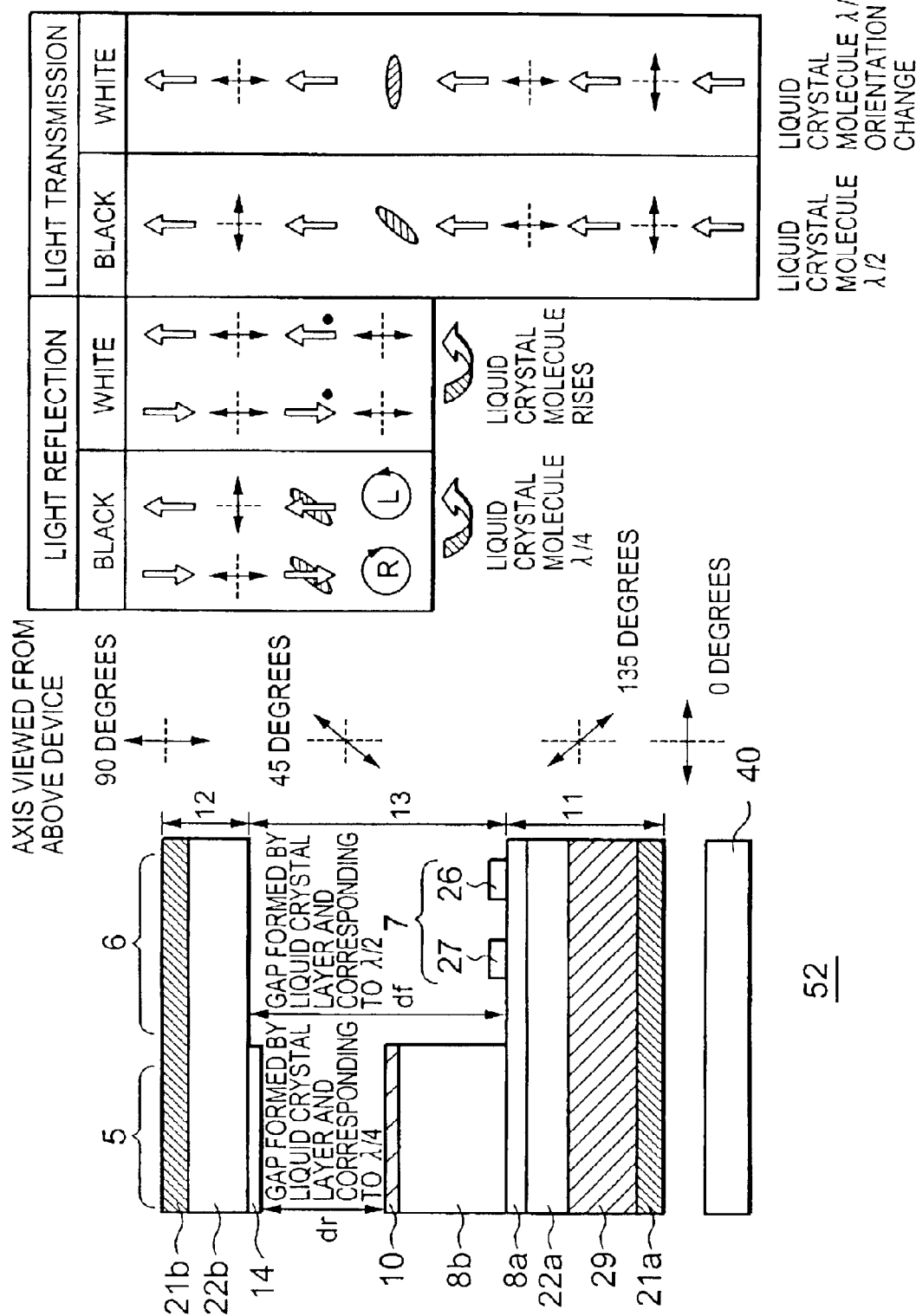
FIG. 1(a) is a cross sectional view illustrating how components constituting a cell of a semi-transmissive liquid crystal display device of a first embodiment are optically arranged.
FIG. 1(b) illustrates an alignment angle at which the components are oriented relative to one another.
FIG. 1(c) illustrates how the components operate in the reflective and transmissive regions.

A semi-transmissive liquid crystal display device of a first embodiment of the invention has a reflective region, in which liquid crystal molecules are driven by a vertical electric field, and a transmissive region, in which liquid crystal molecules are driven by a horizontal electric field. FIG. 1(a) is a cross sectional view illustrating how components constituting a cell of a semi-transmissive liquid crystal display device 52 of the first embodiment are optically arranged and FIG. 1(b) illustrates an alignment angle at which polarizers 21a, 21b, a liquid crystal layer 13 and a one-half wavelength ($\lambda/2$) plate 29 are oriented relative to one another when viewing the device from the side of an opposing substrate 12, and FIG. 1(c) illustrates how those components operate in the reflective and transmissive regions.

As shown in FIG. 1(a), the semi-transmissive liquid crystal display device 52 includes: a lower substrate 11; an opposing substrate 12; a liquid crystal layer 13 sandwiched between the two substrates; and a backlight 40 disposed below the lower substrate 11, in which the lower substrate 11 and the opposing substrate 12 have polarizers 21a and 21b provided respectively on the outer sides of the substrates. Though not shown in FIG. 1(a) for simplification, the lower substrate 11 and the opposing substrate 12 have horizontal alignment films for aligning liquid crystal molecules in a horizontal direction provided respectively on surfaces, contacting the liquid crystal layer 13, of the substrates. Furthermore, in accordance with the invention, a one-half wavelength plate 29 is disposed between a transparent insulating substrate 22a and the polarizer 21a. The remaining configuration of the device is the same as that of the device shown in FIG. 21(a) and the associated components are denoted by the same reference numerals as those used in FIG. 21(a), and therefore, explanation of the components is omitted.

Figure 2:
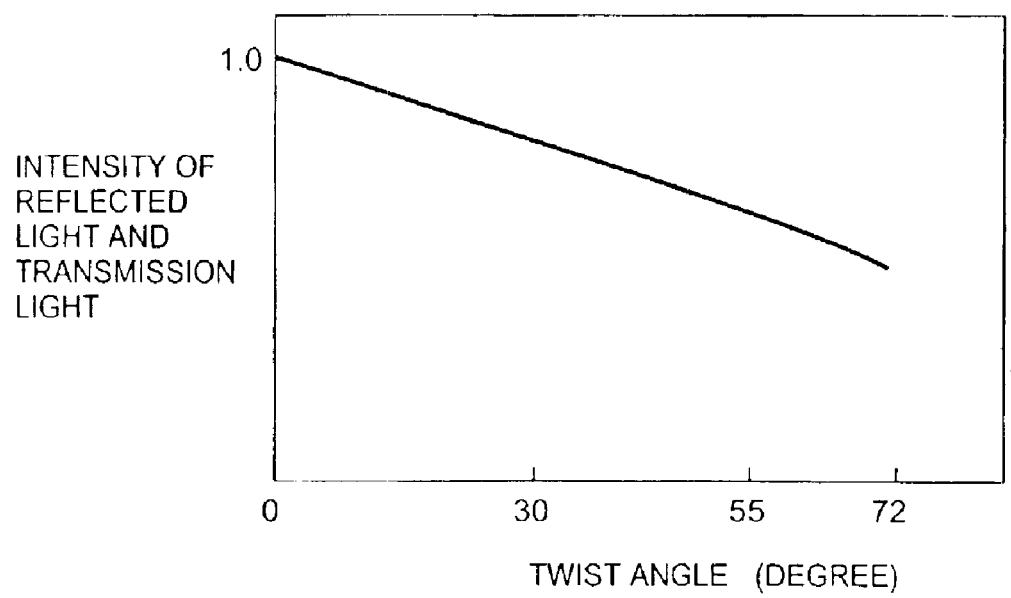
FIG. 2 is a graph showing how the intensity of reflected light and transmission light changes with a twist angle.
Figure 3:
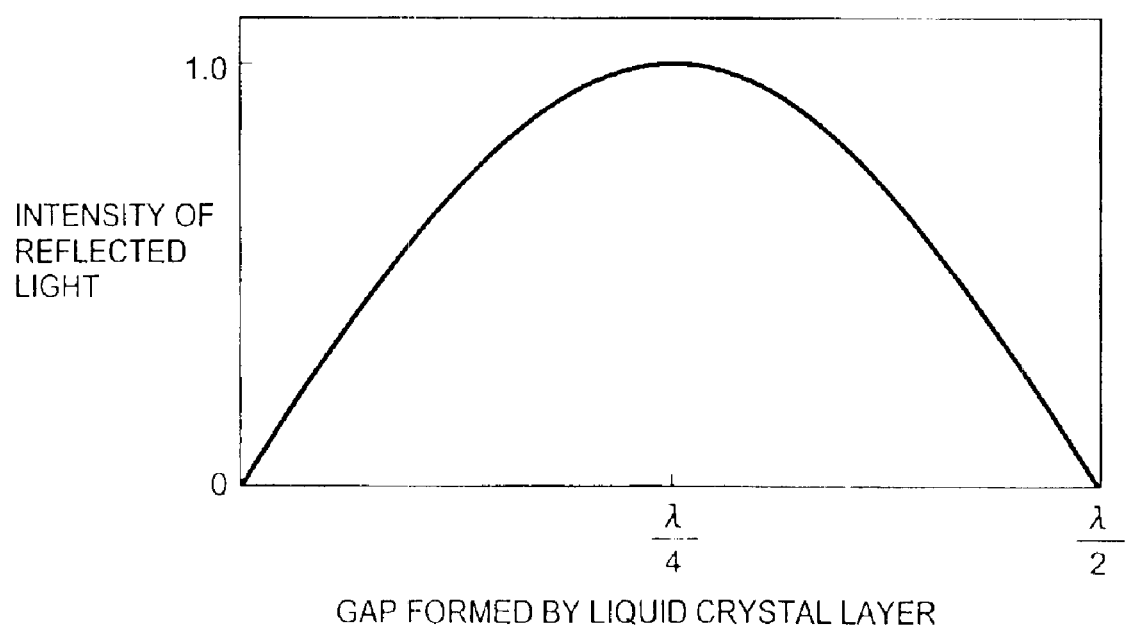
FIG. 3 is a graph showing how the intensity of reflected light changes with a gap formed by a liquid crystal layer.

A twist angle between the horizontal alignment films 20a and 20b is made to be 0 degrees. In a semi-transmissive liquid crystal display device, a twist angle of 0 degrees effectively maximizes the brightness in both the reflective region and the transmissive region. Whereas a Twist Nematic (TN) liquid crystal having a twist angle of 72 degrees utilizes only 50% of reflected light and transmission light, the TN liquid crystal that is made to have a twist angle of 0 degrees utilizes 100% of reflected light and transmission light. Relationship between a twist angle and the intensity of reflected light and transmission light is shown in FIG. 2. However, when a twist angle is made to be 0 degrees and further when $\lambda$ represents a wavelength of light, $\Delta n$ a birefringence of liquid crystal, dr a gap formed by the liquid crystal layer 13 in the reflective region 5, and df a gap formed by the liquid crystal layer 13 in the transmissive region 6, the intensity of reflected light in the reflective region 5 becomes maximum when the product $\Delta n \times dr$ equals $\lambda/4$. Relationship between the product $\Delta n \times dr$ and the intensity of reflected light is shown in FIG. 3. Likewise, the intensity of transmission light in the transmissive region 6 becomes maximum when the product Δn×dr equals λ/2. Relationship between the product Δn×dr and the intensity of transmission light becomes similar to that shown in FIG. 3 when replacing λ/4, λ/2 on axis of abscissas with λ/2, λ, respectively. Then, in the reflective region 5, the gap dr formed by the liquid crystal layer 13 is made equal to λ/4 and in the transmissive region, the gap df formed by the liquid crystal layer 13 is made equal to λ/2.

As shown in FIG. 1(b), when a voltage is not applied to the liquid crystal layer 13 and further when assuming the polarizer 21a located on a lower side of the reflective region 5 and the transmissive region 6 has an alignment angle of 0 degrees, the polarizer 21b located facing the polarizer 21a is made to have an alignment angle of 90 degrees and the liquid crystal layer 13 is made to have an alignment angle of 45 degrees, and the one-half wavelength plate 29 is made to have an alignment angle-of 135 degrees.

How the liquid crystal display device 52 operates when the aforementioned components are made to have the corresponding alignment angles is shown in FIG. 1(c). The device operates in the reflective region 5 in a manner similar to that explained in the description of the device shown in FIG. 21(c) and therefore, it can be concluded that the device operates in a normally-black mode in the reflective region 5.

The device operates in the transmissive region 6 as follows. When a voltage is not applied to the liquid crystal layer 13, linearly polarized light having transmitted through the polarizer 21a and having an alignment angle of 0 degrees transmits through the one-half wavelength plate 29 the liquid crystal layer 13 and then becomes linearly polarized light having an alignment angle of 90 degrees. Thereafter, when the linearly polarized light transmits through the liquid crystal layer 13, the light comes to have its alignment angle further rotated so that the light becomes linearly polarized light having an alignment angle of 0 degrees, and cannot exit the polarizer 21b having an alignment angle of 90 degrees, leading to a display of black color. When a voltage is applied to the liquid crystal layer 13, the liquid crystal layer 13 is made to have an alignment angle of 0 degrees. In this case, when the linearly polarized light having transmitted through the polarizer 21a and having alignment angle of 0 degrees transmits though the one-half wavelength plate 29, the light becomes linearly polarized light having an alignment angle of 90 degrees and even after transmission through the liquid crystal layer 13, the light does not come to have its alignment angle rotated so that the light keeps unchanged having an alignment angle of 90 degrees and exits the polarizer 21b having an alignment angle of 90 degrees, leading to a display of white color.

As noted above, the semi-transmissive liquid crystal display device of the embodiment is configured to have the reflective region 5, in which liquid crystal molecules are driven by a vertical electric field, and the transmissive region 6, in which liquid crystal molecules are driven by a horizontal electric field, thereby allowing the device to have wide viewing angle characteristics and operate in a normally-white mode.

(Second Embodiment)

A semi-transmissive liquid crystal display device of a second embodiment of the invention has liquid crystal molecules driven by a horizontal electric field in both a reflective region and a transmissive region. FIG. 4(a) is a cross sectional view illustrating how a cell of a semi-transmissive liquid crystal display device 53 of the second embodiment is optically arranged and FIG. 4(b) illustrates an alignment angle at which polarizers 21a, 21b, a liquid crystal layer 13 and a one-half wavelength plate 29 are oriented relative to one another when viewing the device from the side of an opposing substrate 12, and FIG. 4(c) illustrates how those components operate in the reflective and transmissive regions.

As shown in FIG. 4(a), since the semi-transmissive liquid crystal display device 53 of the second embodiment has the same cross sectional configuration as that shown in FIG. 20(a) except that the device 53 has the one-half wavelength plate 29, the explanation of the device 53 is omitted herein. A twist angle between two horizontal alignment layers 20a and 20b is made to be 0 degrees as is the case with the first embodiment. As shown in FIG. 4(b), since the polarizers 21a, 21b, the liquid crystal layer 13 and the one-half wavelength plate 29 have the same alignment angle at which the corresponding components shown in FIG. 1(b) are oriented, the explanation of how the aforementioned components are oriented to have the corresponding alignment angle is omitted herein.

How the liquid crystal display device 53 operates when the aforementioned components are made to have the corresponding alignment angle is shown in FIG. 4(c). The device operates in the reflective region 5 in a manner similar to that explained in the description of the device shown in FIG. 20(c) and therefore, it can be concluded that the device operates in a normally-black mode in the reflective region 5. The device operates in the transmissive region 6 in a manner similar to that explained in the description of the device shown in FIG. 1(c) and therefore, it can be concluded that the device operates in a normally-black mode in the transmissive region 6.

As described above, the semi-transmissive liquid crystal display device of the embodiment is configured to have liquid crystal molecules driven by a horizontal electric field in both the reflective region 5 and the transmissive region 6, thereby allowing the device to have wide viewing angle characteristics and operate in a normally-black mode. In particulars since liquid crystal molecules in both the reflective region 5 and the transmissive region 6 are driven by a horizontal electric field, a defective display potentially observed at a boundary between the reflective region 5 and the transmissive region 6 never occurs, providing a better display than that provided when employing the device the first embodiment.

(Third Embodiment)

Figure 5:
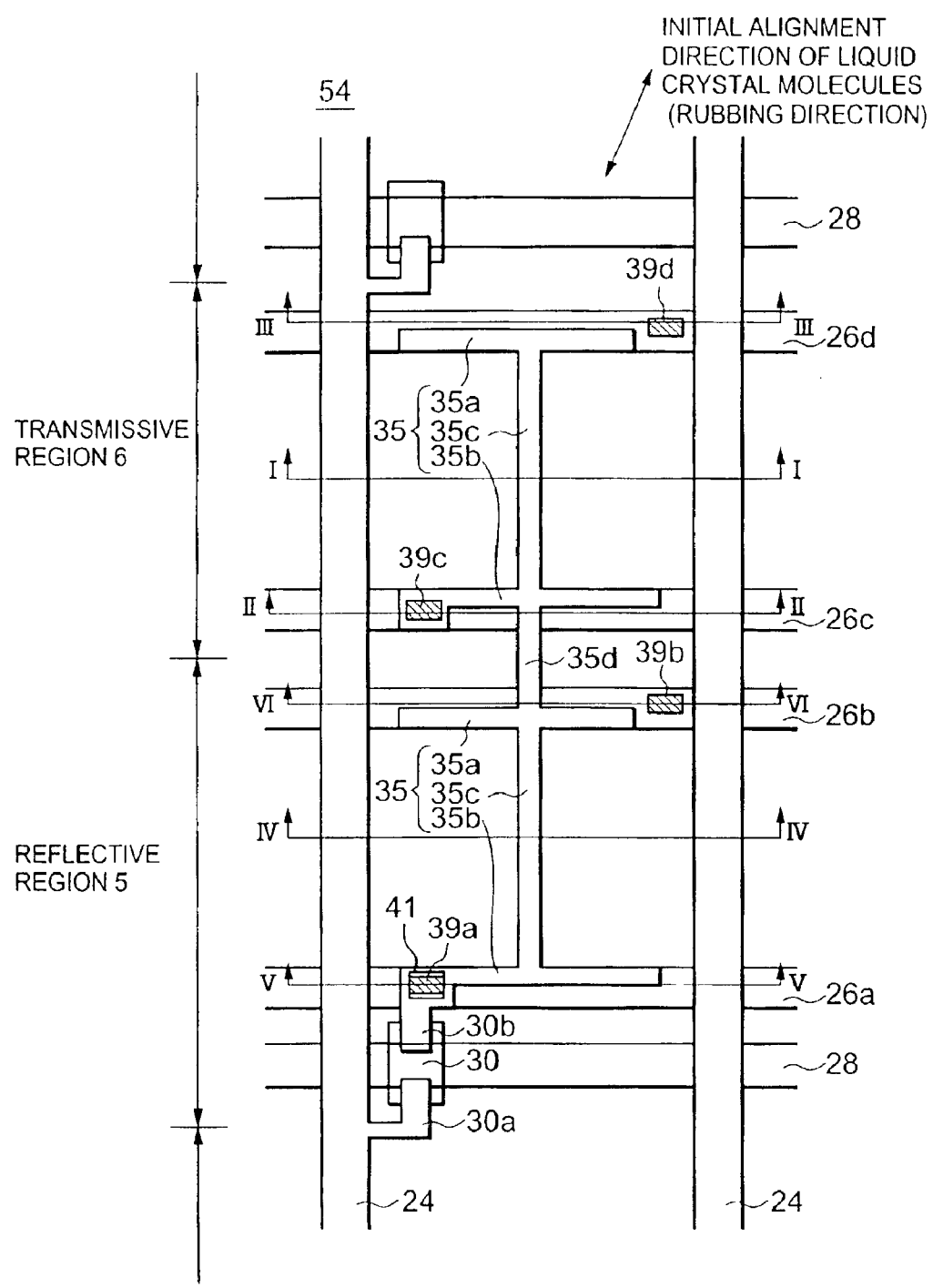
FIG. 5 is a plan view of a semi-transmissive liquid crystal display device of a third embodiment.
Figure 6:
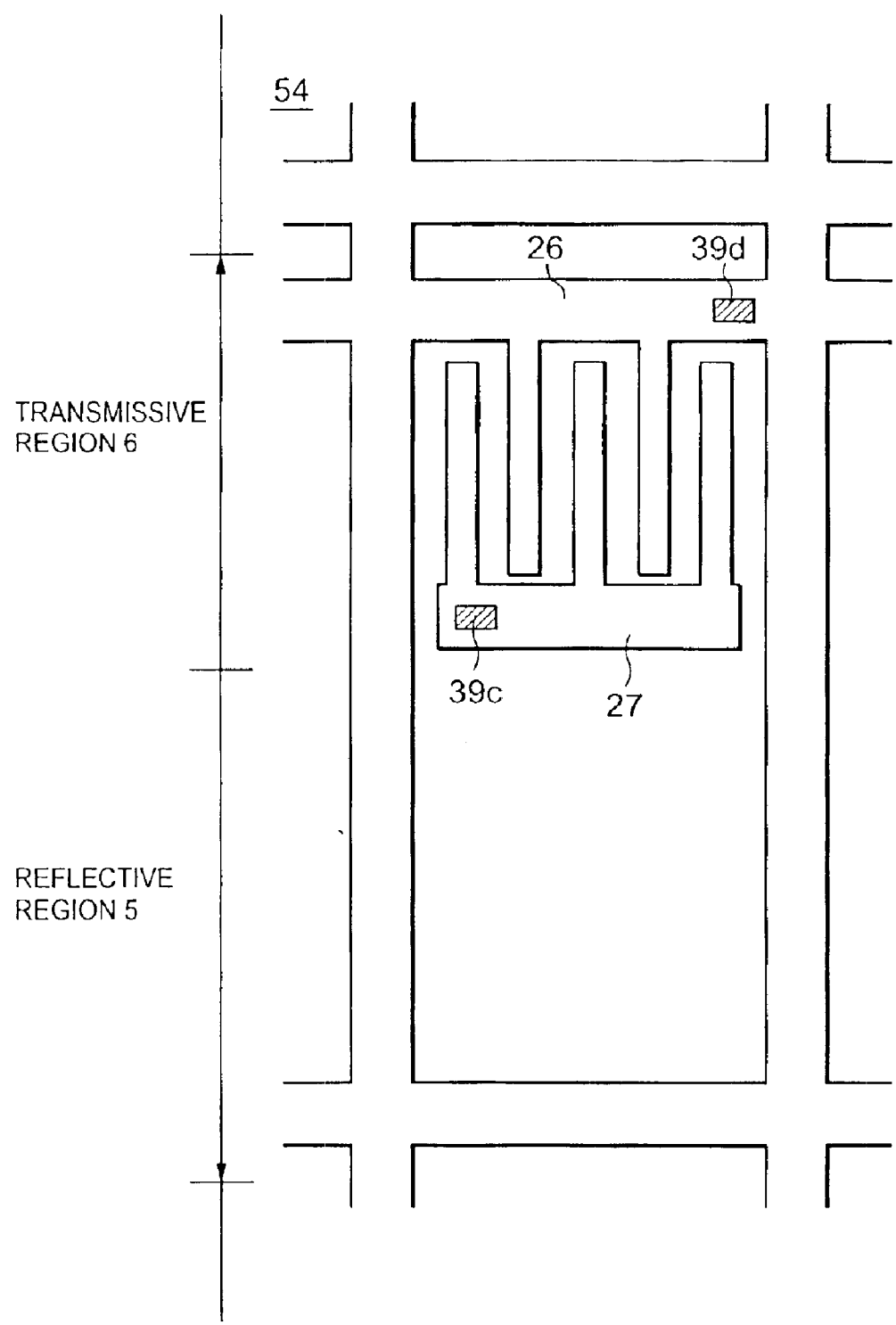
FIG. 6 is a plan view of a semi-transmissive liquid crystal display device of the third embodiment.
Figure 7:
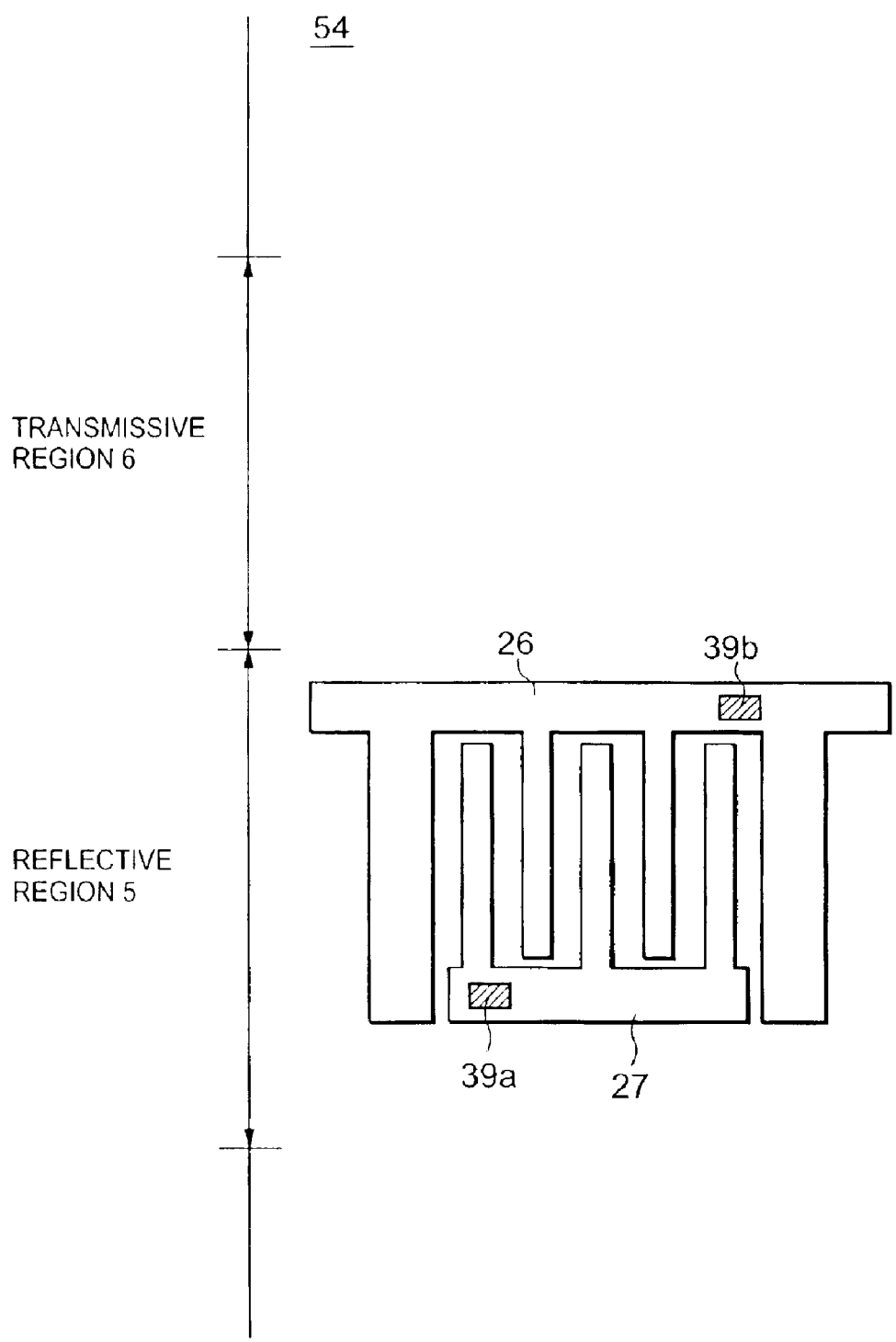
FIG. 7 is a plan view of a semi-transmissive liquid crystal display device of the third embodiment.
Figures 10A, 10B:
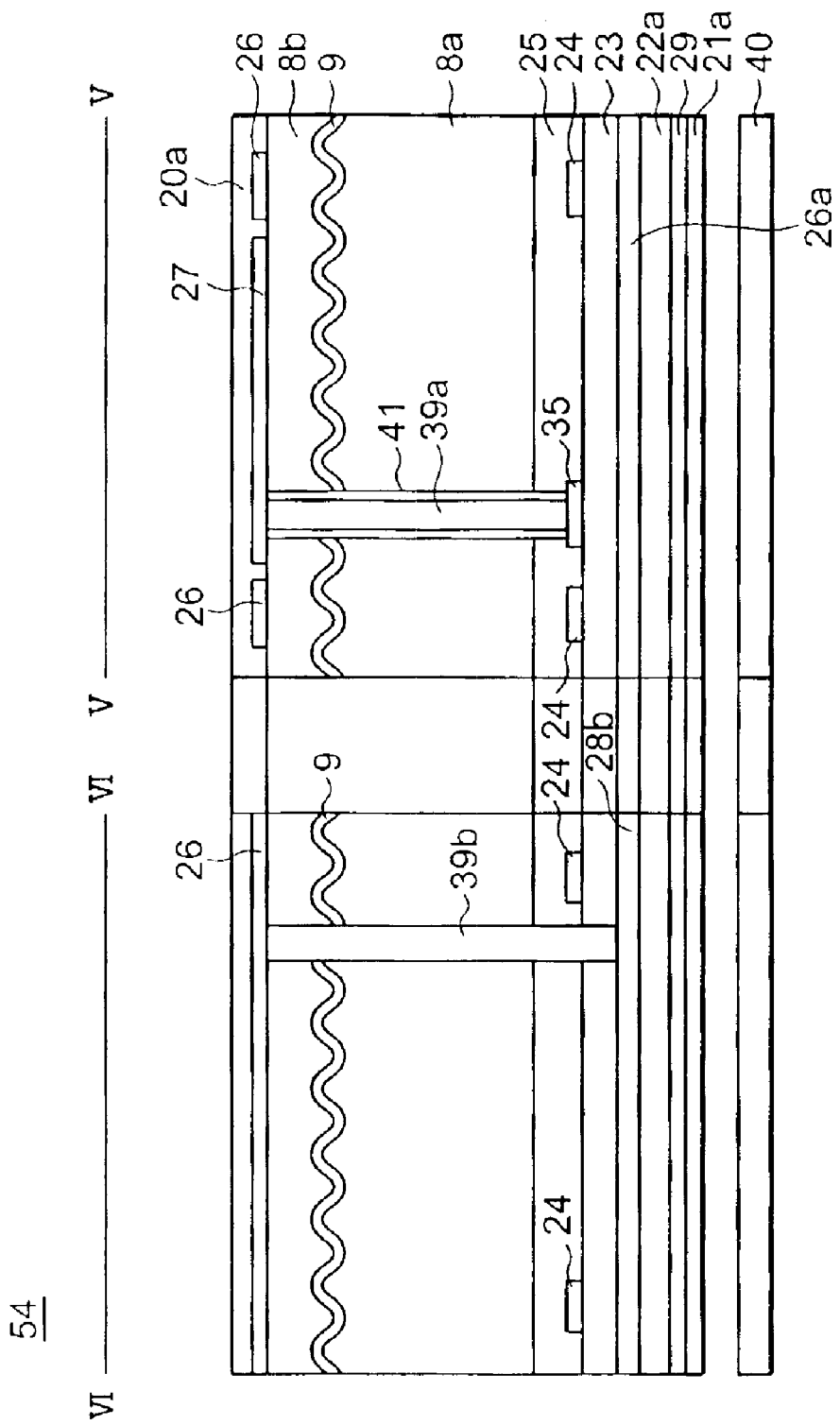
FIG. 10(a) is a cross sectional view taken along line V—V of FIGS. 5, 6, 7.
FIG. 10(b) is a cross sectional view taken along line VI—VI of FIGS. 5, 6, 7.

Although in the first and second embodiments, only how the liquid crystal display device is configured to have the components optically arranged and operates has been explained, in a third embodiment, how layer structure and electrode configuration employed in the second embodiment are built will be explained with reference to FIGS. 5 through 10. FIG. 5 is a plan view of a liquid crystal display device 54 of the third embodiment and FIG. 6 is a plan view of an interconnect level in which an electrode 7 provided in the transmissive region and provided for generation of horizontal electric field is formed, and FIG. 7 is a plan view of an interconnect level in which an electrode 7 provided in the reflective region and provided for generation of horizontal electric field is formed. FIG. 8(a) is a cross sectional view taken along line I—I of FIG. 5 and FIG. 8(b) is a cross sectional view taken along line IV—IV of FIG. 5. FIG. 9(a) is a cross sectional view taken along line II—II of FIG. 5 and FIG. 9(b) is a cross sectional view taken along line III—III of FIG. 5. FIG. 10(a) is a cross sectional view taken along line V—V of FIG. 5 and FIG. 10(b) is a cross sectional view taken along line VI—VI of FIG. 5. Note that the electrode 7 for generation of horizontal electric field consists of a common electrode 26 and a pixel electrode 27.

As shown in FIG. 5 illustrating the plan view of a pixel, a liquid crystal display device 54 has a plurality of pixels provided therein, each being partitioned by a data line 24 and a scanning line 28, and a pixel has a transmissive region 6 in the upper half thereof and a reflective region 5 in the lower half thereof. Referring to FIG. 8 illustrating the cross sectional view of the pixel, the liquid crystal display device 54 comprises a lower substrate 11, an opposing substrate 12 and a liquid crystal layer 13 sandwiched between the two substrates.

As shown in FIGS. 8(a), 8(b), the opposing substrate 12 comprises a transparent insulating substrate 22b, black matrix layers 17 as a light shielding film formed on the substrate 22b, color layers 18 formed so as to partially overlap the black matrix layers 17, and a transparent overcoat layer 19 covering the black matrix layers 17 and the color layers 18. Additionally, in order to prevent the build-up of electrostatic charges due to friction between external objects and the surface of panel of the liquid crystal display device from electrically affecting the liquid crystal layer 13, the transparent insulating substrate 22b is made to have a transparent conductive layer 15 formed on the rear surface of the substrate 22b. The color layer 18 consists of a resin film containing one of red (R), green (G) and blue (B) dyes or pigments.

The lower substrate 11 comprises a transparent insulating substrate 22a, a first metal layer constituting a scanning line 28 (refer to FIG. 5) and a gate electrode (not shown) of a thin film transistor 30, a first interlayer insulation film 23 formed to cover the first metal layer on the substrate 22a, a data line 24 and a source electrode 30b of the thin film transistor 30 formed on the first interlayer insulation film 23, a second metal layer constituting a drain electrode 30a (refer to FIG. 5) of the thin film transistor 30, a second interlayer insulation film 25 formed to cover the second metal layer on the first interlayer insulation film 23, and a common electrode 26 and a pixel electrode 27, both being formed of a transparent electrode. Moreover, formed on the first interlayer insulation film 23 is a later-described auxiliary pixel electrode 35 along with the data line 24. The data line 24 and the auxiliary pixel electrode 35 are formed of the second metal layer.

It should be appreciated that in this description, a level layer positioned nearer the liquid crystal layer 13 than other level layers is referred to as an upper level layer and a level layer farther the liquid crystal layer 13 than other level layers is referred to as a lower level layer.

The lower substrate 11 and the opposing substrate 12 have an alignment film 20a and an alignment film 20b formed on the respective surfaces of the substrates. Furthermore, those alignment films are rubbed to homogeneously align the liquid crystal molecules of the liquid crystal layer 13 in a specific direction inclined at an angle of 10 to 30 degrees relative to a direction in which the pixel electrode 27 and the common electrode 26 extend as shown in FIG. 5, and then, the two substrates are bonded to each other so that the two alignment films of the substrates face each other. An angle at which the liquid crystal molecules are aligned is referred to as an initial alignment direction.

Spacers (not shown) are disposed between the lower substrate 11 and the opposing substrate 12 to maintain the thickness of the liquid crystal layer 13 and further, a sealant (not shown) is provided in the periphery of the liquid crystal layer 13 to prevent liquid crystal molecules from leaking outside a display region.

As shown in FIG. 5, the lower substrate 11 comprises the data line 24 to which a data signal is supplied, common electrode interconnect lines 26a, 26b, 26c, 26d and the common electrode 26 to which a reference voltage potential is supplied, and the pixel electrode 27 provided to correspond to a pixel to be displayed. In addition to those components, the substrate 11 includes the scanning line 28 to which a scanning signal is supplied and the thin film transistor (TFT) 30.

The thin film transistor 30 has the gate electrode, the drain electrode 30a and the source electrode 30b and is disposed in the vicinity of each of cross points of the scanning lines 28 and the data lines 24 so as to correspond to each pixel. The gate electrode, the drain electrode 30a and the source electrode 30b are electrically connected to the scanning line 28, the data line 24 and the pixel electrode 27, respectively.

Both the common electrode 26 and the pixel electrode 27 are formed in a comb shape and the comb-shaped portions of both electrodes extend parallel to the data line 24. In addition, the comb-shaped portions of the common electrode 26 and the comb-shaped portions of the pixel electrode 27 are generally formed so that one comb-shaped portion of one of the two electrodes is interposed between two comb-shaped portions of the other of the two electrodes, and further, the comb-shaped portions of the common electrode 26 and the comb-shaped portions of the pixel electrode 27 are disposed apart from one another.

Moreover, as shown in FIGS. 5 to 7, the common electrode 26 formed of a transparent electrode is connected to the common electrode interconnect line 26d via a contact hole 39d for common electrode in the transmissive region 6 and is connected to the common electrode interconnect line 26b via a contact hole 39b for common electrode in the reflective region 5. As can be seen from FIGS. 6, 7, a light shielding film does not geometrically exist between the common electrode 26 that covers the data line 24 and the pixel electrode 27 disposed adjacent the common electrode 26.

Furthermore, as shown in FIG. 5, the pixel electrode 27 formed of a transparent electrode is connected to the auxiliary pixel electrode 35 formed of the second metal layer via a contact hole 39c for pixel electrode in the transmissive region and is connected to the auxiliary pixel electrode 35 via a contact hole 39a for pixel electrode in the reflective region.

As noted above, connecting the common electrode and the pixel electrode respectively to the common electrode interconnect line and the auxiliary pixel electrode via the corresponding contact holes allows for a reduction in resistance of the common electrode and the pixel electrode. This gives a solution to the problem of high resistance of a transparent electrode.

The liquid crystal display device 54 configured to have liquid crystal molecules driven by a horizontal electric field in both the transmissive region and the reflective region operates as follows. That is, a pixel is selected by a scanning signal supplied through the scanning line 28 and a data signal supplied through the data line 24 is written to the pixel. Then, an electric field parallel to the transparent insulating substrates 22a, 22b is generated between the common electrode 26 and the pixel electrode 27, and the electric field makes liquid crystal molecules rotate in a plane parallel to the transparent insulating substrates 22a, 22b, allowing the device to display a desired image. In FIGS. 6, 7, longitudinal areas surrounded by the common electrode 26 and the pixel electrode 27 are referred to as a column. The liquid crystal display device 54 is configured to have both the common electrode 26 and the pixel electrode 27 made from a transparent material, ITO.

As shown in FIGS. 8(a), 8(b), 9(a), 9(b), 10(a) and 10(b), the liquid crystal display device 54 is able to have the auxiliary pixel electrode 35 formed of the second metal layer on the first interlayer insulation film 23 and below the second interlayer insulation film 25. As shown in FIG. 5, the auxiliary pixel electrode 35 consists of first, second and third electrode portions 35a, 35b and 35c, and those electrode portions in the transmissive region 6 are constructed in the following manner. That is, the first electrode portion 35a is disposed on the common electrode interconnect line 26d formed of the first metal layer to overlap the common electrode interconnect line 26d in order to form a accumulation capacitor and likewise, the second electrode portion 35b is disposed on the common electrode interconnect line 26c formed of the first metal layer to overlap the common electrode interconnect line 26c in order to form an accumulation capacitor, and the third electrode portion 35c is formed to extend parallel to the data line 24 in order to physically couple together the first and second electrode portions 35a, 35b and located below the pixel electrode 27 that is formed on the second interlayer insulation film 25 and formed of a transparent metal. Thus, as a whole, the first, second and third electrode portions 35a, 35b and 35c forms an "I" shaped electrode. As shown in FIG. 5, an accumulation capacitor is also formed in the reflective region 5 in the same manner as that explained in the description of the capacitor in the transmissive region. Note that the liquid crystal display device 54 may be constructed such that an accumulation capacitor is formed in only one of the transmissive region and the reflective region.

The first to third electrode portions 35a, 35b, 35c as an auxiliary pixel electrode are formed of the oblique second metal layer on the first interlayer insulation film 23. As can be seen from FIG. 5, the drain electrode 30a and the source electrode 30b of the thin film transistor 30 are also formed of the second metal layer and the source electrode 30b and the auxiliary pixel electrode 35 are connected to each other.

As described above, although the auxiliary pixel electrodes 35 made of an opaque metal slightly reduce the transmittance of the device, when the auxiliary pixel electrodes 35 are connected to each other to form accumulation capacitors on both upper and lower sides of the pixel shown in the plan view, the pixel is able to have a large accumulation capacitance, stabilizing an image to be displayed. Note that the shape of the auxiliary pixel electrodes 35 is not limited to that shown in FIG. 5, but may take any form as long as the auxiliary pixel electrodes 35 is positioned below the pixel electrode 27.

As shown in FIGS. 6 and 8(a), 8(b), in the transmissive region 6 and the reflective region 5, the common electrode 26 is formed above the level of the scanning line 28 and the data line 24, and formed wider than the scanning line 28 and the data line 24 so as to completely cover the scanning line 28 and the data line 24.

Furthermore, as shown in FIG. 8(b), in the reflective region 5, the reflector 9 is formed above the level of the scanning line 28 and the data line 24, and formed so as to completely cover the scanning line 28 and the data line 24.

Forming the common electrode 26 and the reflector 9 in the aforementioned manner makes it possible to shield a leakage electric field from the data line 24 and the scanning line 28, enlarging an effective display area that can be controlled by an electric field between the pixel electrode 27 and the common electrode 26 and then increasing the aperture ratio of the device.

Likewise, the reflector 9 can be formed so as to cover a channel region of the TFT 30. Forming the reflector 9 in the aforementioned manner makes it possible to shield a leakage electric field that is toward the TFT 30 from outside, increasing the stability of the characteristics of TFT and then increasing the reliability of an image to be displayed.

The common electrode 26 employed in the liquid crystal display device 54 is formed from a transparent material, ITO. This increases a transmissive area in the liquid crystal display device 54, increasing the aperture ratio of the device 54.

Although an ITO has a sheet resistance of about 100 ohms/square, which is relatively large, the common electrode can reduce its overall resistance by connecting the common electrode 26 made of ITO to the common electrodes 26a, 26b, 26c and 26d at locations along longitudinal and lateral directions in each pixel while effectively establishing a redundancy of the common electrode.

As can be seen from FIG. 8(a), in the transmissive region 6, the second interlayer insulation film 25 is provided between the common electrode 26 and the data line 24. Making a ratio d/∈ sufficiently large where d represents the thickness of the second interlayer insulation film 25 and ∈ represents the dielectric constant allows for a reduction in a parasitic capacitance between the data line 24 and the common electrode 26. Moreover, as can be seen from FIG. 8(b), in the reflective region 5, the second interlayer insulation film 25, a second insulation film 8b, the reflector 9 and a third insulation film 8c are provided between the common electrode 26 and the data line 24 separating those two conductors sufficiently apart from each other, thereby reducing a parasitic capacitance between the data line 24 and the common electrode 26.

Reducing probability of occurrence of longitudinal cross-talk and lateral cross-talk eliminates need for formation of a black matrix layer 17 that is provided to prevent occurrence of defective display due to leakage electric fields from the data line 24 and the scanning line 28. Accordingly, the black matrix layer 17 may be formed only to improve viewing contrast of the display face of the device, allowing for a reduction in a width of the black matrix layer 17 or elimination of the black matrix layer 17. Elimination of the black matrix layer 17 allows for increase in the aperture ratio of the liquid crystal display device 54.

Furthermore, in the liquid crystal display device 54, both the common electrode 26 and the pixel electrode 27 in the transmissive region 6 are formed on the second interlayer insulation film 25, and both the common electrode 26 and the pixel electrode 27 in the reflective region 5 are formed on the third insulation film 8c. Forming the common electrode 26 and the pixel electrode 27 at the same level of interconnect makes it possible to form the common electrode 26 and the pixel electrode 27 through the same process step and by using the same material, leading to increase in manufacturing efficiency.

Moreover, in the liquid crystal display device 54, the film structure in which components ranging from the transparent insulating substrate 11 on the lower side of the device to the second interlayer insulation film 25 are formed is the same in the transmissive region 6 and the reflective region 5, allowing those components to be formed through the same process steps.

After formation of the interlayer insulation film 25, the second insulation film 8b is formed in the reflective region 5. Although the second insulation film 8b is typically formed to have a two-layered structure consisting of a concave-convex film and a flattened layer, the film 8b can also be formed using a half-tone mask to have a single layer structure. The reflector 9 made of aluminum is formed on the second insulation film 8b having a concave-convex surface. The reflector 9 acts to scatter light incident thereon. The third insulation film 8c is formed on the reflector 9 and then flattened. The common electrode 26 and the pixel electrode 27, both made of ITO, are formed on the third insulation film 8c in the same manner as that employed to form those components in the transmissive region 6, and then, the alignment film 20a is formed thereon, completing formation of the lower substrate 11.

Additionally, turning again to FIGS. 8(a), 8(b), for instance, when a pinhole resides in the alignment film 20a, a liquid crystal material 300 constituting the liquid crystal layer 13 and the metal constituting the common electrode 26 and the pixel electrode 27 electrochemically react with each other via the pinhole, the metal constituting the common electrode 26 and the pixel electrode 27 potentially becomes an ion and then dissolves into the liquid crystal layer 13. The electrochemical dissolution of the metal ion into the liquid crystal layer 13 causes the display non-uniformity of liquid crystal display device.

Especially, when the liquid crystal layer 13 is made from a liquid crystal material having an enhanced polarity, the amount of metal ions dissolving into the liquid crystal layer 13 further increases. Since the horizontal electric field driven liquid crystal display device needs to employ a material having a large dielectric anisotropy value $\Delta\in$, the amount of metal ions dissolving into the liquid crystal layer 13 is particularly large.

For this reason, the common electrode 26 and the pixel electrode 27, both of which are provided so as to contact the alignment film 20a, are made of ITO that is stable against electrochemical reaction with a liquid crystal material, i. e., shows low reactivity to a liquid crystal material, which configuration provides higher reliability to the liquid crystal display device 54 as compared to the case in which the common electrode 26 and the pixel electrode 27 are made of a metal other than ITO.

The contact holes 39a to 39d of the embodiment are formed in a rectangle shape with a short side of not less than 6 μm. As shown in FIGS. 5 and 10(a), in order for the contact hole 39a to serve to connect the pixel electrode 27 and the auxiliary pixel electrode 35 to each other, and further, avoid contact with the reflector 9, the contact hole 39a has an insulation film 41 formed over the outer wall thereof. Though not shown in the figure, the device may be constructed so that the inner wall of the insulation film 41 is covered by a metal film and then an ITO connected to the pixel electrode 27 is disposed so as to cover the metal film. This enables the device to isolate the pixel electrode 27 from the reflector 9 and reduce the resistance between the pixel electrode 27 and the auxiliary pixel electrode 35, increasing the display uniformity of liquid crystal display device.

Furthermore, as shown in FIGS. 5 and 10(b), the contact hole 39b serves to connect the pixel electrode 27 and the auxiliary pixel electrode 35 to each other. Note that in this case, similarly to the configuration shown in FIG. 10(a), the device may be constructed such that the contact hole 39b has an insulation film formed over the outer wall thereof in order for the reflector 9 to avoid contact with the common electrode 26. Though not shown in the figure, using the same manner as that employed to form the contact hole 39a, the device may be constructed so that the inner wall of the contact hole 39b is covered by a metal film and then an ITO connected to the pixel electrode 27 is disposed so as to cover the metal film, increasing the display uniformity of liquid crystal display device.

As shown in FIGS. 5 and 9, the contact holes 39c, 39d in the transmissive region 6 serve to provide electrical connection between the pixel electrode 27 and the auxiliary pixel electrode 35, and between the common electrode 26 and the common electrode interconnect line 26d, respectively. Though not shown in the figure, using the same manner as that employed to form the contact hole 39b, the device may be constructed so that the inner walls of the contact holes 39c, 39d each are covered by a metal film and then ITOs connected to the pixel electrode 27 and the common electrode 26 are disposed so as to cover the corresponding metal films, increasing the display uniformity of liquid crystal display device.

(Fourth Embodiment)

Figure 11:
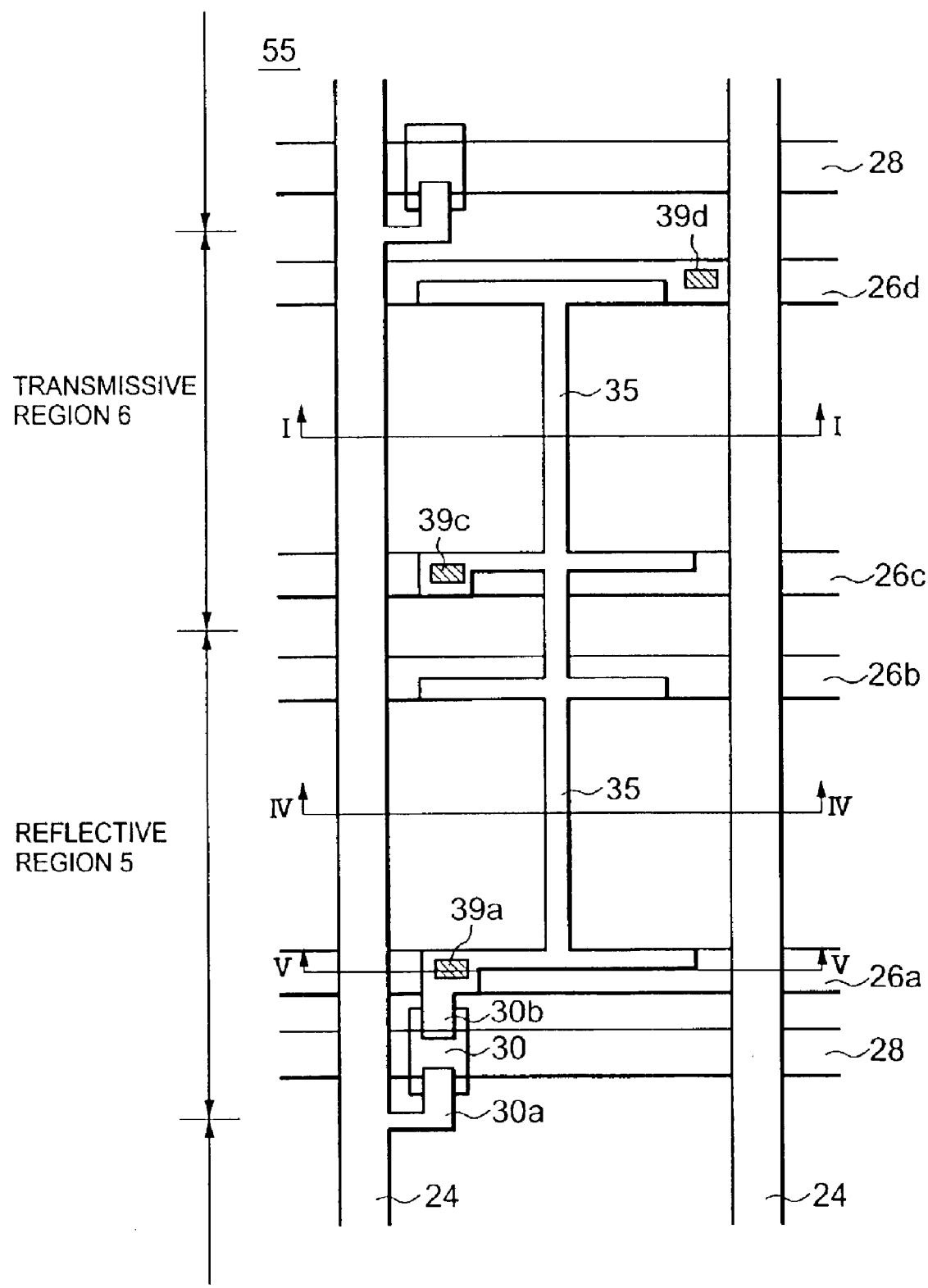
FIG. 11 is a plan view of a semi-transmissive liquid crystal display device of a fourth embodiment.

In a fourth embodiment, how layer structure and electrode configuration employed in the first embodiment are built will be explained with reference to FIGS. 11, 12(a) and 12(b). Since the configuration of a transmissive region 6 of the fourth embodiment is the same as that of the third embodiment, only the difference between the configurations of reflective regions 5 of the third and fourth embodiments will be explained briefly. FIG. 11 is a plan view of a liquid crystal display device 55 of the fourth embodiment and FIG. 12(a) is a cross sectional view taken along line IV—IV of FIG. 11, and FIG. 12(b) is a cross sectional view taken along line V—V of FIG. 11.

Figure 12:
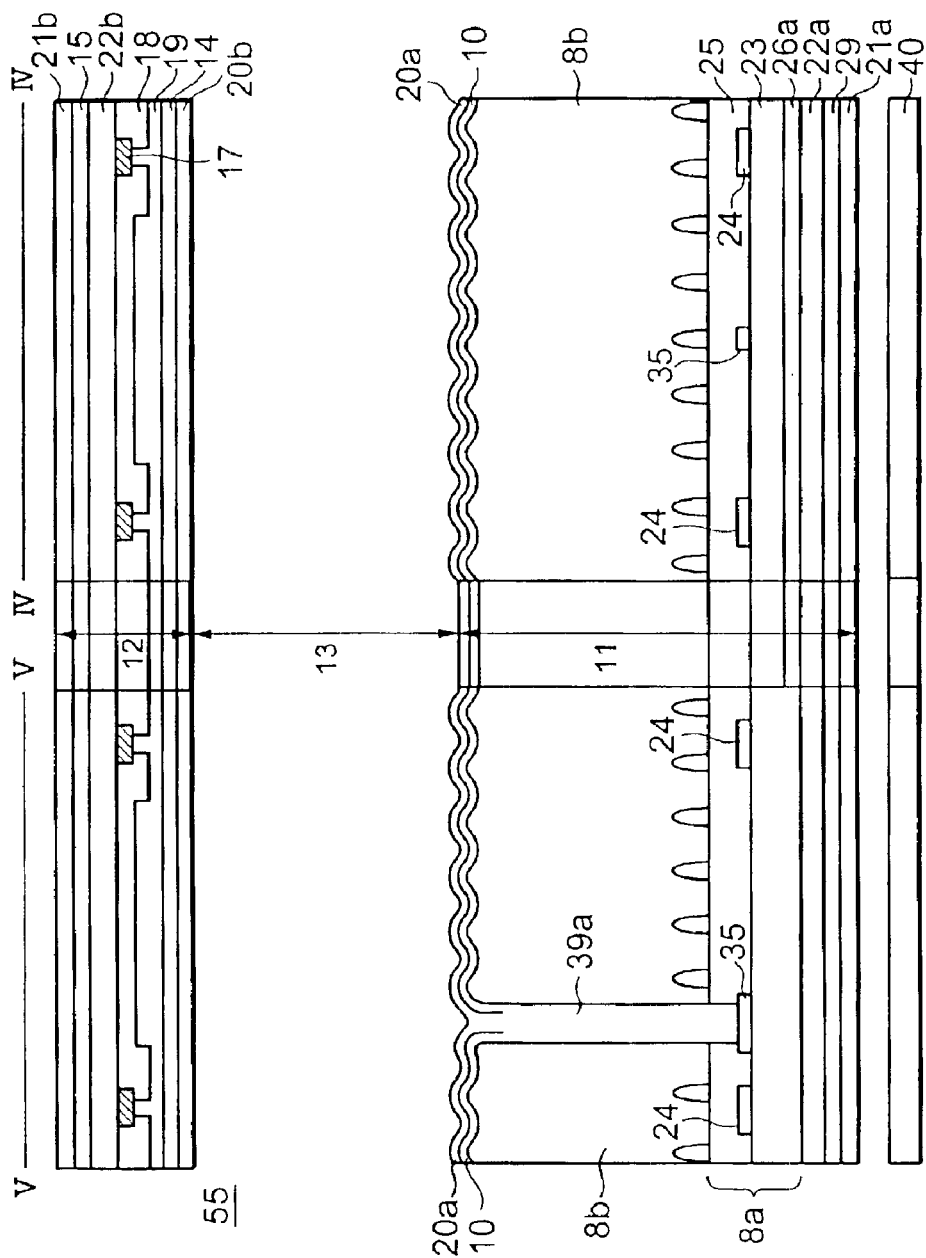
FIG. 12(a) is a cross sectional view taken along line IV—IV of FIG. 11.
FIG. 12(b) is a cross sectional view taken along line V—V of FIG. 11.

As shown in FIG. 12(a), in the reflective region 5, a transparent opposing electrode 14 made of ITO is formed between an overcoat layer 19 and an alignment film 20b of an opposing substrate 12. A lower substrate 11 has a reflecting pixel electrode 10 formed therein instead of a reflector 9 and the reflecting pixel electrode 10 is formed in the uppermost level of interconnect in the lower substrate 11. Note that an alignment film 22a is further formed on the reflecting pixel electrode 10.

As shown in FIG. 12(b), a contact hole 39a serves to connect the reflecting pixel electrode 10 and an auxiliary pixel electrode 35 to each other. Though not shown in the figure, similarly to the third embodiment, the inner wall of the contact hole 39a is covered by a metal film and then an ITO connected to the reflecting pixel electrode 10 is disposed so as to cover the metal film, increasing the display uniformity of liquid crystal display device.

(Fifth Embodiment)

Figure 13:
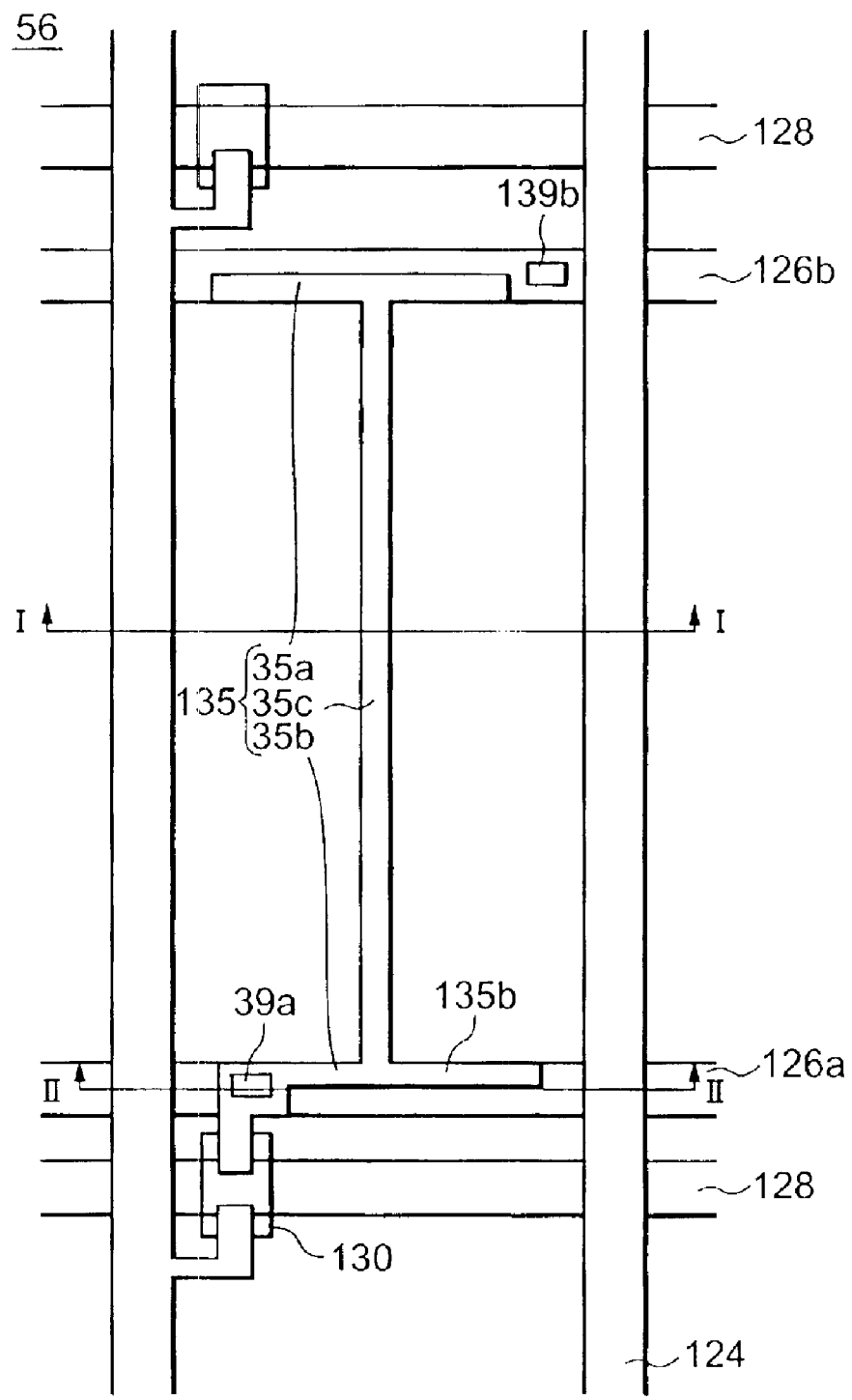
FIG. 13 is a plan view of a semi-transmissive liquid crystal display device of a fifth embodiment.

As is the case with the third embodiment, a semi-transmissive liquid crystal display device of a fifth embodiment is configured to have liquid crystal molecules driven by a horizontal electric field in both a reflective region and a transmissive region. Although each pixel of the device of the third embodiment is divided into two regions, i. e., the transmissive region and the reflective region, each pixel of the device of the fifth embodiment has reflective regions and transmissive regions geometrically blended with one another. The fifth embodiment will be explained with reference to FIGS. 13, 14, 15, 16(a) and 16(b). FIG. 13 is a plan view of a liquid crystal display device 56 of the fifth embodiment and FIG. 6 is a plan view of an interconnect level in which an electrode 107 provided for generation of horizontal electric field and consisting of a common electrode 126 and a pixel electrode 127, is formed. FIG. 15 is a cross sectional view taken along line I—I of FIGS. 13, 14 and FIG. 16(a) is a cross sectional view taken along line II—II of FIGS. 13, 14 and FIG. 16(b) is a cross sectional view taken along line III—III of FIGS. 13, 14.

Figure 14:
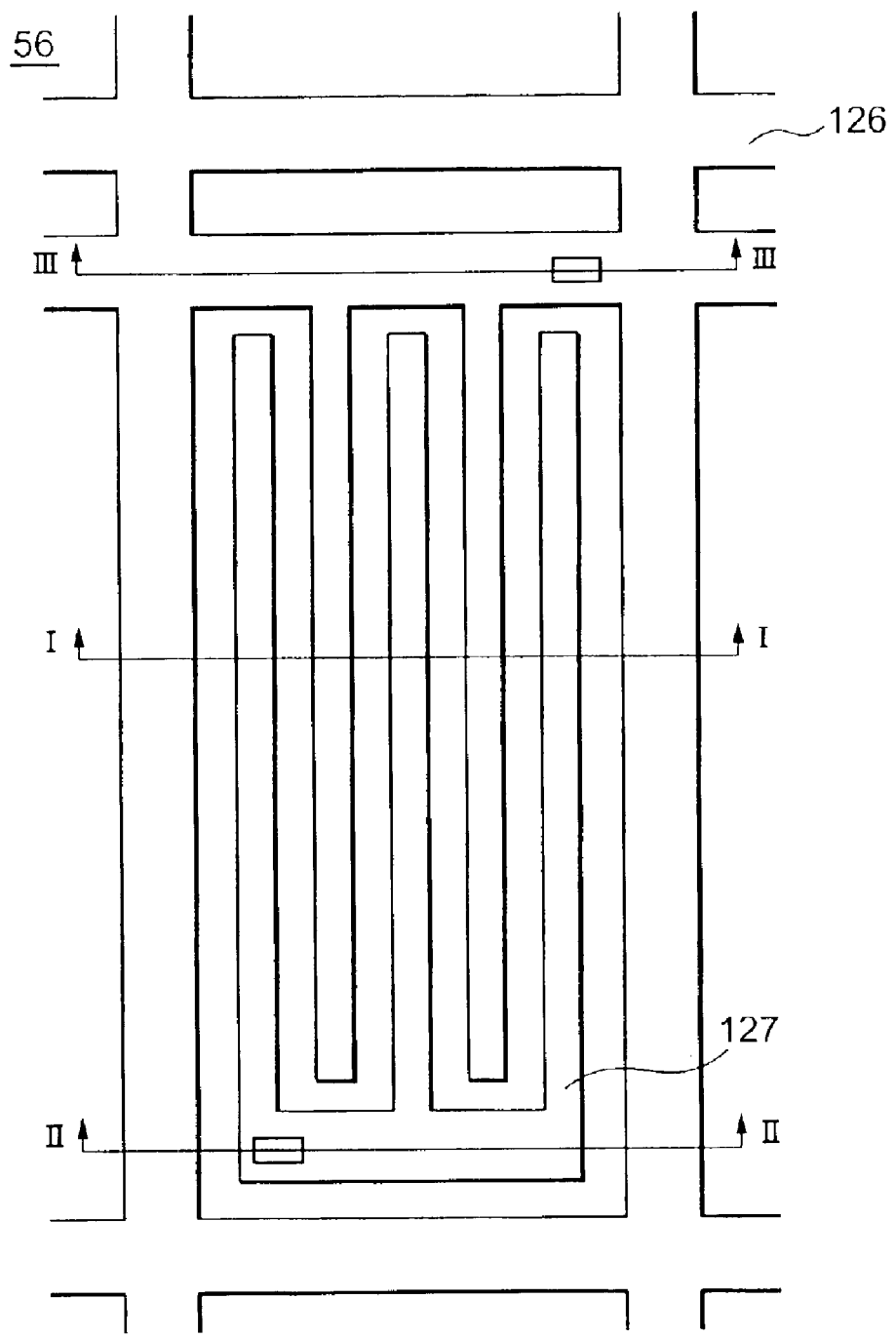
FIG. 14 is a plan view of a semi-transmissive liquid crystal display device of the fifth embodiment.
Figure 15:
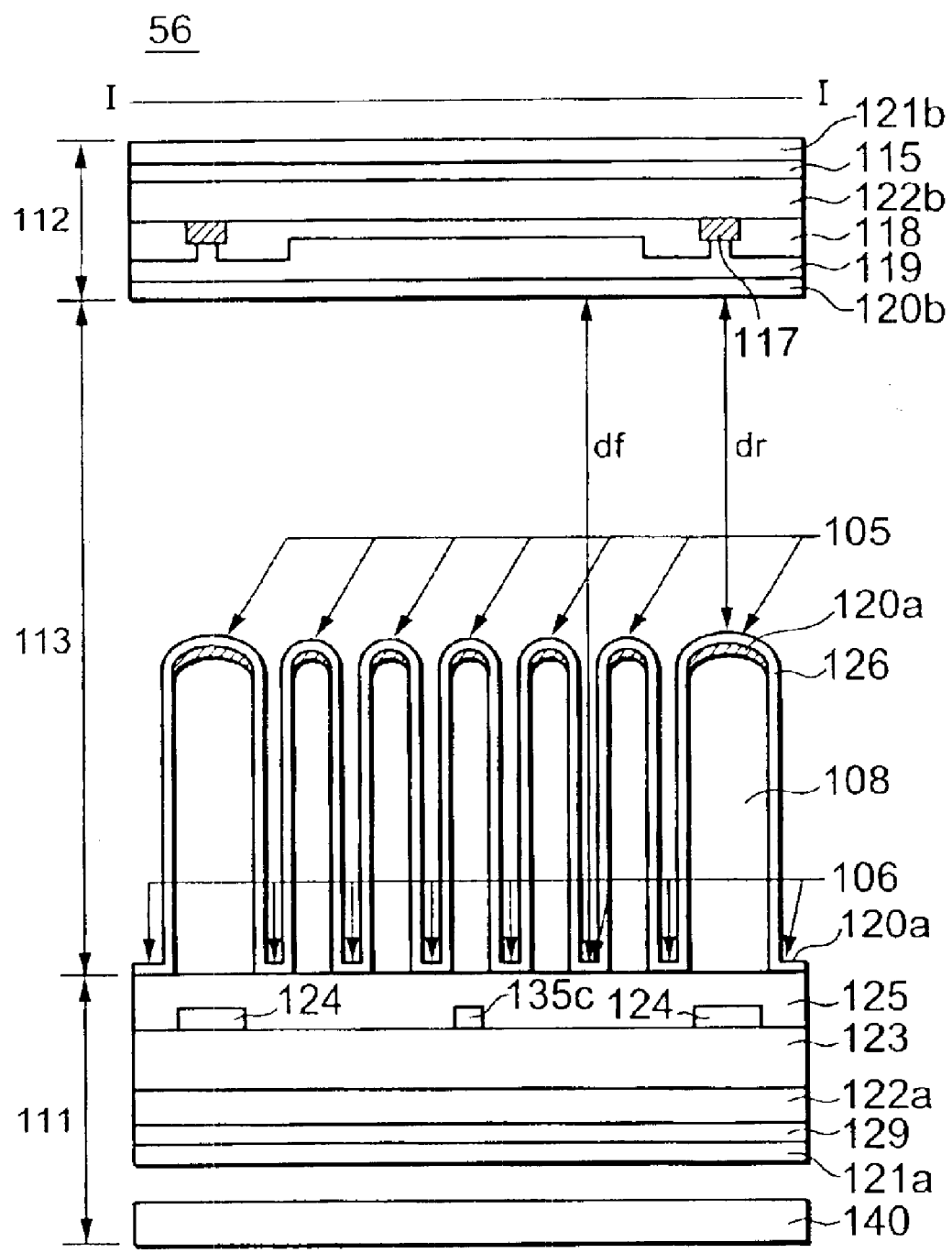
FIG. 15 is a cross sectional view taken along line I—I of FIGS. 13, 14.

As shown in FIGS. 13,14, individual pixels of the liquid crystal display device 56 are separated from one another by data lines 124 and scanning lines 128, and liquid crystal molecules in one pixel are entirely driven by a horizontal electric field, which configuration is the same as that shown in FIG. 5. In addition, as is illustrated in the cross sectional view shown in FIGS. 15, 16, the liquid crystal display device 56 comprises a lower substrate 111, an opposing substrate 112 and a liquid crystal layer 113 sandwiched between the two substrates, in which a gap dr is formed by the liquid crystal layer 113 that is sandwiched between the opposing substrate 112 and the common electrode 126/the pixel electrode 127 of the lower substrate 111, and a gap df is formed by the liquid crystal layer 113 that is sandwiched between the opposing substrate 112 and portions of the lower substrate 111 on which portions the common electrode 126 and the pixel electrode 127 of the lower substrate 111 are not disposed. That is, the common electrode 126 and the pixel electrode 127 of the lower substrate 111 constitute a reflective region and the portions of the lower substrate 11 on which portions the common electrode 126 and the pixel electrode 127 of the lower substrate 111 are not disposed constitute a transmissive region. Since the configuration of the opposing substrate 112 is the same as that of the opposing substrate 12, shown in FIG. 5, of the third embodiment, the explanation thereof is omitted herein.

Components, ranging from a transparent insulating substrate 122a to a second interlayer insulation film 125, of the lower substrate 111 of the fifth embodiment are formed in the same manner as that employed to form the corresponding components of the opposing substrate 11, shown in FIG. 5, of the third embodiment. That is, the lower substrate 111 comprises the transparent insulating substrate 122a, a first metal layer constituting the scanning line 128, etc., formed on the transparent insulating substrate 122a, a first interlayer insulation film 123 formed thereon, a second metal layer constituting a data line 124, etc., formed on the first interlayer insulation film 123, and the second interlayer insulation film 125 formed thereon. However, the film configuration on the second interlayer insulation film 125 differs from that shown in FIG. 5. As shown in FIG. 15, reflective regions 105 and transmissive regions 106 are formed on the second interlayer insulation film 125. An insulation film 108 is formed in each of the reflective regions 105 and a reflecting common electrode 126 or a reflecting pixel electrode 127, both made of aluminum, is formed on the insulation film 108. An alignment film 120a is formed on upper and side surfaces of each of the reflecting common electrode 126 and the reflecting pixel electrode 127. On the other hand, in each of the transmissive regions 106, the alignment film 120a is formed on the second interlayer insulation film 125. Referring again to FIG. 14, the reflective regions 105 and the transmissive regions 106 are disposed so that the area occupied by the reflecting common electrode 126 and the reflecting pixel electrode 127 constitutes the reflective regions 105 and the remaining area constitutes the transmissive regions 106.

As is the case with the third embodiment and as shown in FIGS. 13, 14, the lower substrate 111 of the liquid crystal display device 56 comprises a data line 124 to which a data signal is supplied, and common electrode interconnect lines 126a, 126b and the reflecting common electrode 126 to which a reference voltage potential is supplied, and the pixel electrode 127 provided to correspond to a pixel to be displayed. In addition to those components, the substrate 111 includes the scanning line 128 to which a scanning signal is supplied and a thin film transistor (TFT) 130.

Referring to the plan view, both the reflecting common electrode 126 and the reflecting pixel electrode 127 are formed in a comb shape and the comb-shaped portions of both electrodes extend parallel to the data line 124. In addition, the comb-shaped portions of the reflecting common electrode 126 and the comb-shaped portions of the reflecting pixel electrode 27 are formed so that one comb-shaped portion of one of the two electrodes is interposed between two comb-shaped portions of the other of the two electrodes and the comb-shaped portions of the reflecting common electrode 126 and the comb-shaped portions of the reflecting pixel electrode 27 are disposed apart from one another. A pixel is selected by a scanning signal supplied through the scanning line 128 and a data signal supplied through the data line 124 is written to the pixel. Then, an electric field parallel to the transparent insulating substrates 122a, 122b is generated between the reflecting common electrode 126 and the reflecting pixel electrode 127, and the electric field makes liquid crystal molecules rotate in a plane parallel to the transparent insulating substrates 122a, 122b, allowing the device to display a desired image.

Moreover, as shown in FIGS. 13, 14, the reflecting common electrode 126 is connected to the reflecting common electrode interconnect line 126d via a contact hole 139b for common electrode. The reflecting pixel electrode 127 is connected to an auxiliary pixel electrode 135 formed of a second metal layer via a contact hole 139a for pixel electrode.

As is the case with the third embodiment and as shown in FIG. 13, the liquid crystal display device 56 includes the auxiliary pixel electrode 135 consisting of first, second and third electrode portions 135a, 135b and 135c, and those electrode portions are constructed in the following manner. That is, the first electrode portion 135a is disposed on the common electrode interconnect line 126b formed of a first metal layer to overlap the common electrode interconnect line 126b in order to form a accumulation capacitor and likewise, the second electrode portion 135b is disposed on a common electrode interconnect line 126a formed of the first metal layer to overlap the common electrode interconnect line 126a in order to form an accumulation capacitor, and the third electrode portion 135c is formed to extend parallel to the data line 124 in order to physically couple together the first and second electrode portions 135a, 135b and located below the reflecting pixel electrode 127 that is formed on an insulation film 108. Thus, as a whole, the first, second and third electrode portions 135a, 135b and 135c forms an "I" shaped electrode.

Since the auxiliary pixel electrode 135 made of an opaque metal is located below the reflecting common electrode 126 and the reflecting pixel electrode 127, and is not located below a geometrical gap between the reflecting common electrode 126 and the reflecting pixel electrode 127, and further, almost all of the auxiliary pixel electrode 135 is covered by those reflecting electrodes, the transmittance of the device hardly be lowered. In addition, when the auxiliary pixel electrodes 135 are connected to each other to form accumulation capacitors on both upper and lower sides of the pixel shown in the plan view, the pixel is able to have a large accumulation capacitance, stabilizing an image to be displayed.

As shown in FIGS. 13, 14, the reflecting common electrode 126 is formed above the level of the scanning line 128 and the data line 124, and formed wider than the scanning line 128 and the data line 124 so as to completely cover the scanning line 128 and the data line 124.

Forming the reflecting common electrode 126 in the aforementioned manner makes it possible to shield a leakage electric field from the data line 124 and the scanning line 128, enlarging an effective display area that can be controlled by an electric field between the reflecting pixel electrode 127 and the reflecting common electrode 126 and then increasing the aperture ratio of the device.

Referring to FIG. 14, the reflecting common electrode 126 does not cover a channel region of the TFT 130. However, the device may be configured to have the reflecting common electrode 126 formed to cover the channel region of the TFT 130. This permits the device to shield a leakage electric field that is toward the TFT 30 from outside, increasing the stability of the characteristics of TFT and then increasing the reliability of an image to be displayed.

Although both the reflecting common electrode 126 and the reflecting pixel electrode 127 of the liquid crystal display device 56 are formed from an opaque material, aluminum, those electrodes are formed in the reflective region, thereby eliminating probability of reduction in the aperture ratio of the device. In the third embodiment, all the common electrode interconnect lines are made of ITO and connected to the common electrode in each pixel. However, in the fifth embodiment, since the reflecting common electrode 126 is made of a low resistance metal, aluminum, the reflecting common electrode need not be connected to the common electrode interconnect lines 126a, 126b in each pixel. Accordingly, if the reflecting common electrode 126 is made to have its connection portions coupled together along longitudinal and lateral directions, it can sufficiently lower its overall interconnect resistance. Nevertheless, in order to establish a redundancy of the common electrode, the reflecting common electrode 126 is coupled to the common electrode interconnect lines 126a, 126b in each pixel. Furthermore, unlike the third embodiment, the common electrode interconnect lines 126a, 126b are formed so that the reflecting common electrode 126 and the reflecting pixel electrode 127, both being formed wider than the common electrode interconnect lines 126a, 126b, completely covers the common electrode interconnect lines 126a, 126b. Accordingly, placement of the common electrode interconnect lines 126a, 126b within the lower substrate never reduces the effective aperture ratio of the device.

Figure 16:
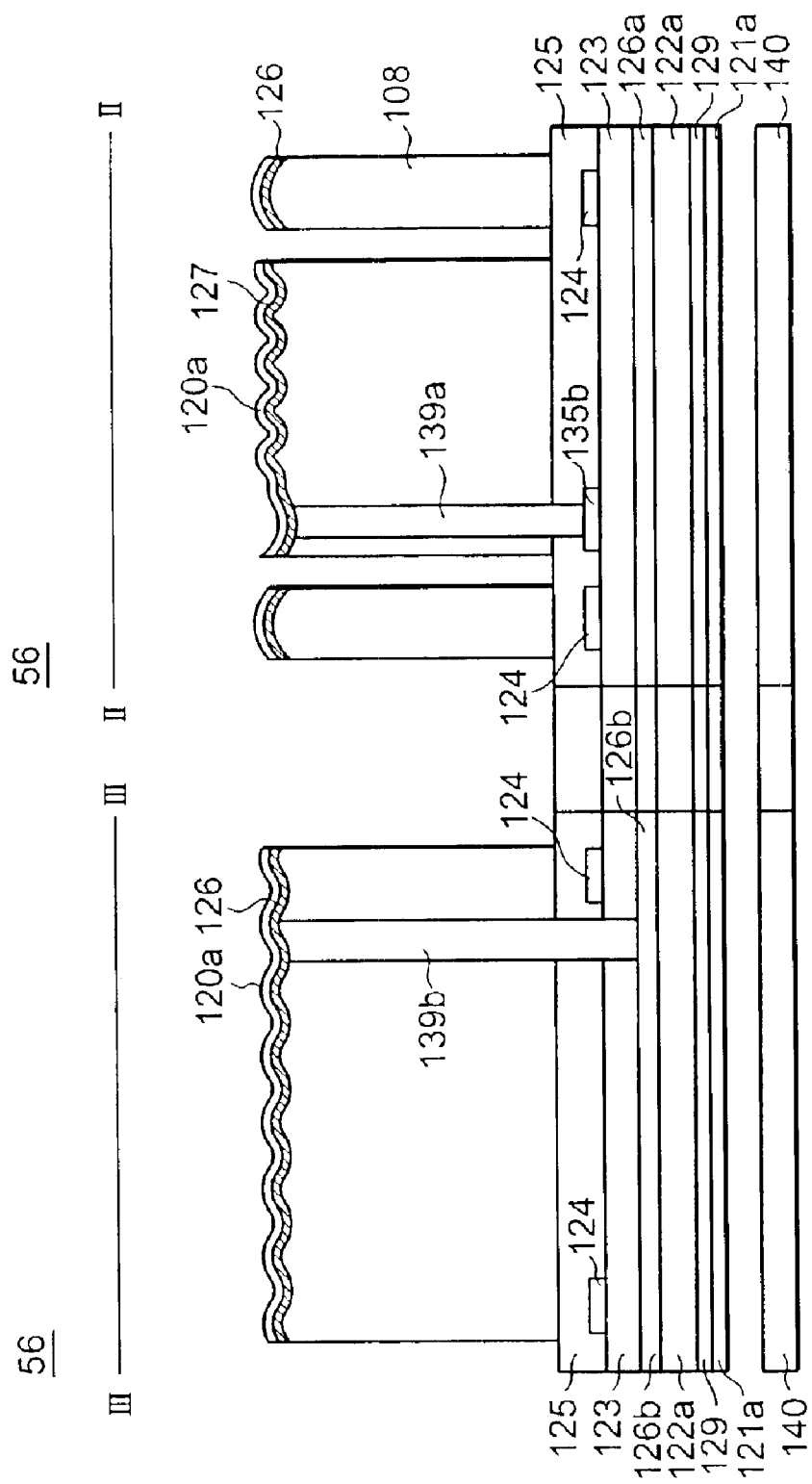
FIG. 16(a) is a cross sectional view taken along line II—II of FIGS. 13, 14.
FIG. 16(b) is a cross sectional view taken along line III—III of FIGS. 13, 14.

As can be seen from FIGS. 15, 16, since the insulation film 108 having a large thickness is provided between the reflecting common electrode 126 and the data line 124, a parasitic capacitance between the reflecting common electrode 126 and the data line 124 can be reduced.

As described above, similarly to the third embodiment, reducing probability of occurrence of longitudinal cross-talk and lateral cross-talk eliminates need for formation of a black matrix layer 17 that is provided to prevent occurrence of defective display due to leakage electric fields from the data line 124 and the scanning line 128. Accordingly, elimination of the black matrix layer 17 allows for increase in the aperture ratio of the liquid crystal display device 56.

Furthermore, in the liquid crystal display device 56, both the reflecting common electrode 126 and the reflecting pixel electrode 127 are formed on the second interlayer insulation film 125. Forming the reflecting common electrode 126 and the reflecting pixel electrode 127 at the same level of interconnect makes it possible to form the reflecting common electrode 126 and the reflecting pixel electrode 127 through the same process step and by using the same material, leading to increase in manufacturing efficiency.

Moreover, in the liquid crystal display device 56, since the reflective region 105 and the transmissive region 106 can be formed through completely the same process steps, the number of process steps is reduced as compared to that required to form the device of the third embodiment. In the liquid crystal display device 56, formation of the interlayer insulation film 125 is followed by formation of the insulation film 108. Similarly to the second insulation film of the third embodiment, the insulation film 108 can be formed through two process steps to have a two-layered structure consisting of a concave-convex film and a flattened layer, or alternatively, can be formed through one process step using a half-tone mask to have a single layer structure. A reflecting film made of aluminum is deposited on the insulation film 108 and then patterned to form the reflecting common electrode 126 and the reflecting pixel electrode 127. Thereafter, a contact hole 139a for pixel electrode and a contact hole 139b for common electrode are formed.

The contact holes 139a, 139b employed in the embodiment are formed in a rectangle shape with a short side of not less than 6 μm. As shown in FIGS. 13 and 16, the contact hole 139a serves to connect the reflecting pixel electrode 127 and an auxiliary pixel electrode 135 to each other. The contact hole 139b serves to connect the reflecting common electrode 126 and the common electrode interconnect line 126b. Disposing on the inner walls of the contact holes 139a, 139b aluminum for providing an electrical connection to the reflecting pixel electrode 127 and the reflecting common electrode 126 enables the device to reduce the resistance between the associated electrodes and increase the display uniformity of the device. Finally, an alignment film 120a is formed over the surface of the substrate to complete formation of the lower substrate 111.

(Sixth Embodiment)

Figure 17:
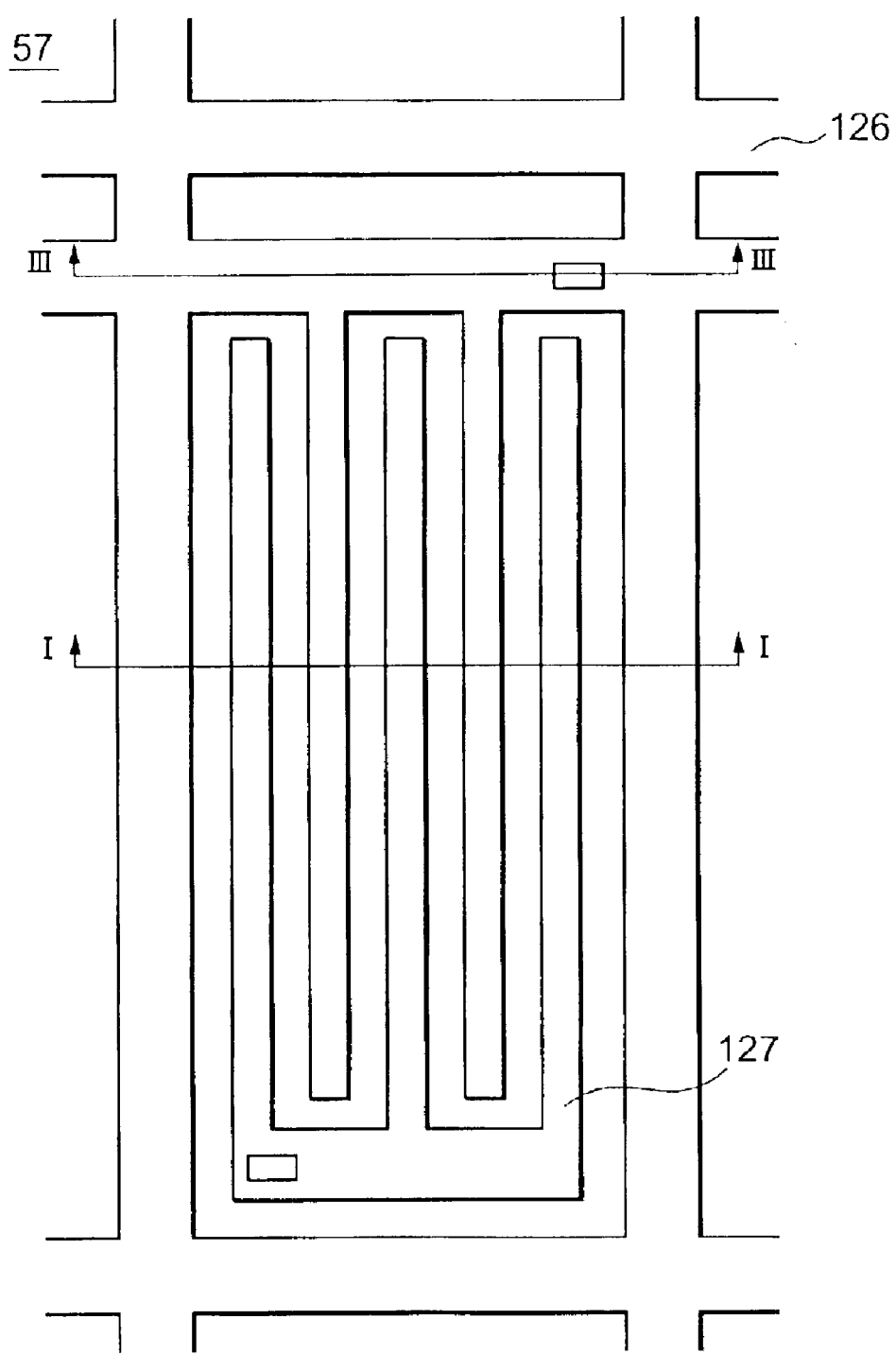
FIG. 17 is a plan view of a semi-transmissive liquid crystal display device of a sixth embodiment.
Figure 18:
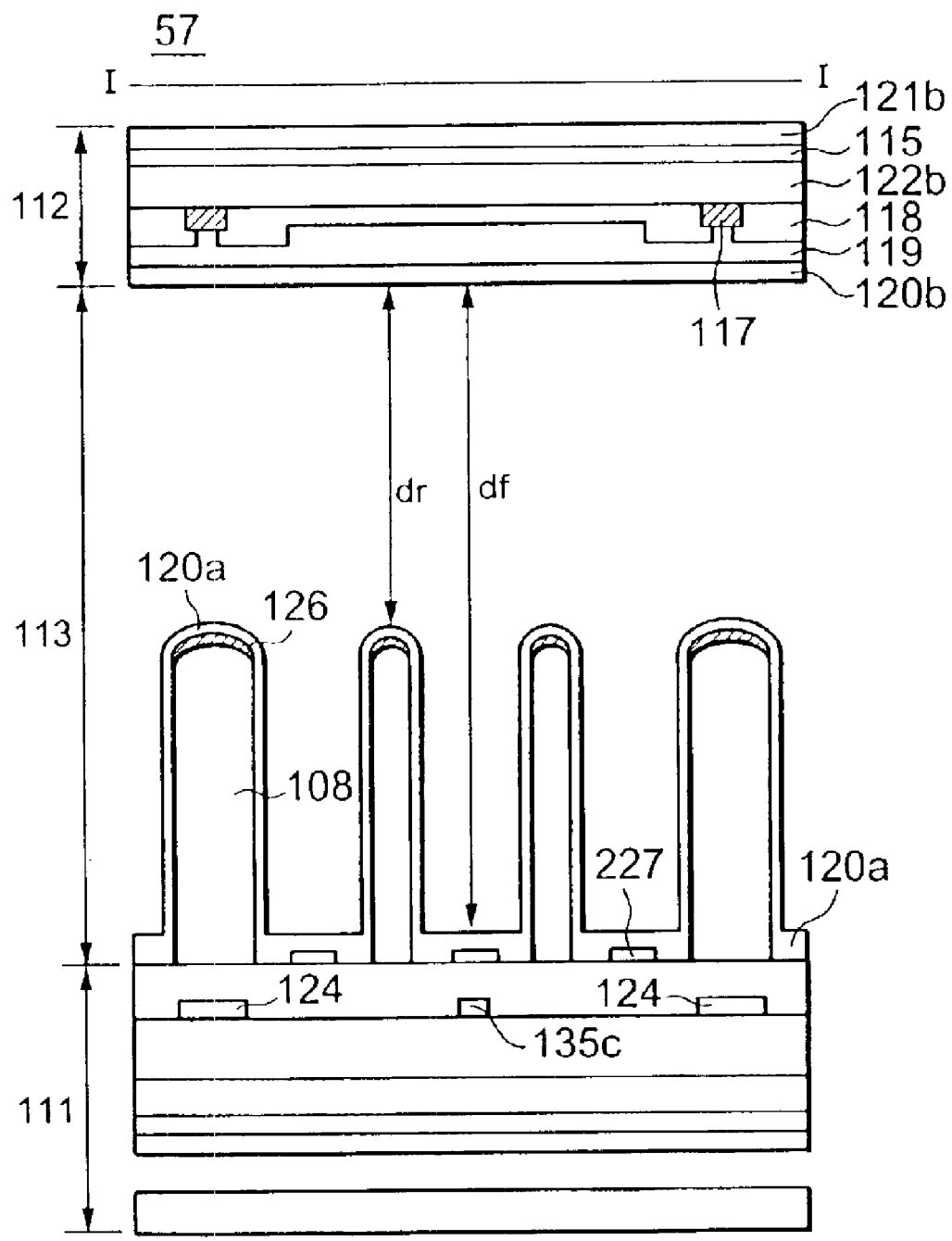
FIG. 18 is a cross sectional view taken along line I—I of FIGS. 13, 17.
Figure 19:
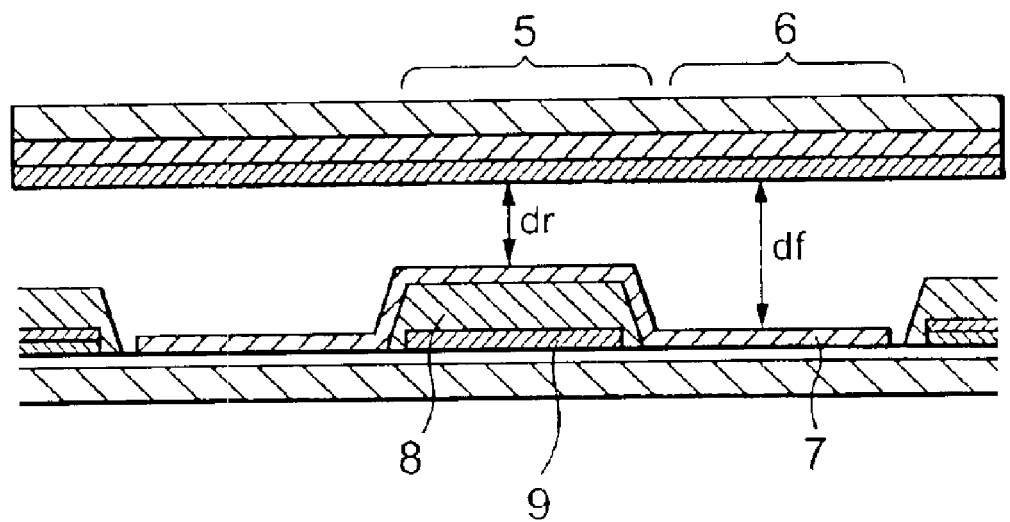
FIG. 19 is a cross sectional view of a conventional semi-transmissive liquid crystal display device.

Although the device of the fifth embodiment is configured to have both the common electrode and the pixel electrode provided therein to generate a horizontal electric field and serve as a reflecting electrode, the device of a sixth embodiment is configured to have a common electrode formed as a reflecting electrode in a reflective region and a pixel electrode formed as a transparent electrode in a transmissive region. That is, the sixth embodiment can be constructed by combining the third and fifth embodiments. The sixth embodiment will be explained with reference to FIGS. 17, 18. The plan view of the liquid crystal display device 56 of the fifth embodiment shown in FIG. 13 can also be referred when the description of a liquid crystal display device 57 of the sixth embodiment is made. That is, the film structure below a second interlayer insulation film 125 of a lower substrate 111 of the sixth embodiment is the same as that of the fifth embodiment. The configuration of an opposing substrate 112 of the sixth embodiment is also the same as that of the fifth embodiment. FIG. 17 is a plan view of an interconnect level in which an electrode 107 provided for generation of horizontal electric field and consisting of a transparent pixel electrode 227 and a reflecting common electrode 126, is formed. FIG. 18 is a cross sectional view taken along line I—I of FIGS. 13, 17. The following explanation will be made highlighting the difference between the sixth and fifth embodiments and explanation of the same parts and configuration as those of the fifth embodiment is omitted.

As shown in FIGS. 17, 18, in the liquid crystal display device 57, one pixel is constructed so that only a portion of the one pixel in which the reflecting common electrode 126 is formed serves as a reflecting region and the remaining portion thereof serves as a transmissive region. The small number of concave-convex portions that are formed by selectively removing the thick insulation film 108 makes manufacture of the device of the embodiment easier as compared to the manufacture of the device of the fifth embodiment.

In the plan view, both the reflecting common electrode 126 and the transparent pixel electrode 227 are formed in a comb shape and the comb-shaped portions of both electrodes are generally formed so that one comb-shaped portion of one of the two electrodes is interposed between two comb-shaped portions of the other of the two electrodes and the comb-shaped portions of the reflecting common electrode 126 and the comb-shaped portions of the transparent pixel electrode 227 are disposed apart from one another. As shown in FIG. 18, the difference between the sixth and fifth embodiments is that the pixel electrode 227 of the sixth embodiment is not made from a reflective material but from a transparent material, and is formed lower by the thickness of the insulation film 108, which is not formed under the electrode 227, than the reflective electrode of the fifth embodiment. Similarly to the fifth embodiment, the device of the embodiment operates such that a pixel is selected by a scanning signal supplied through the scanning line 128 and a data signal supplied through the data line 124 is written to the pixel. Then, an electric field parallel to the transparent insulating substrates 122a, 122b is generated between the reflecting common electrode 126 and the reflecting pixel electrode 227, and the electric field makes liquid crystal molecules rotate in a plane parallel to the transparent insulating substrates 122a, 122b, allowing the device to display a desired image.

As shown in FIG. 17, the reflecting common electrode 126 is formed above the level of the scanning line 128 and the data line 124, and formed wider than the scanning line 128 and the data line 124 so as to completely cover the scanning line 128 and the data line 124.

Forming the reflecting common electrode 126 in the aforementioned manner makes it possible to shield a leakage electric field from the data line 124 and the scanning line 128, enlarging an effective display area that can be controlled by an electric field between the transparent pixel electrode 227 and the reflecting common electrode 126 and then increasing the aperture ratio of the device.

As described above, reducing probability of occurrence of longitudinal cross-talk and lateral cross-talk eliminates need for formation of a black matrix layer 117 that is provided to prevent occurrence of defective display due to leakage electric fields from the data line 124 and the scanning line 128, increasing the aperture ratio of the liquid crystal display device 57.

Furthermore, in the liquid crystal display device 57, both the reflecting common electrode 126 and the transparent pixel electrode 227 are formed on the second interlayer insulation film 125. Thus, forming the reflecting common electrode 126 and the transparent pixel electrode 227 at the same level of interconnect makes it possible to form the reflecting common electrode 126 and the transparent pixel electrode 227 through the same process step and by using the same material, leading to increase in manufacturing efficiency. In addition, the small number of concave-convex portions that are formed by selectively removing the thick insulation film 108 makes manufacture of the device of the embodiment easier as compare to the manufacture of the device of the fifth embodiment.

(Seventh Embodiment)

As a seventh embodiment, how the devices of the first to sixth embodiments commonly should have a desirable twist angle and the product of a birefringence of liquid crystal layer and a gap formed by a liquid crystal layer will be explained.

The graph, shown in FIG. 2, of how the intensity of reflected light and transmission light changes with a twist angle indicates that the twist angle preferably takes values allowing the intensity of reflected light and transmission light to become not less than 90% of the maximum intensity, reached when the twist angle is zero, of reflected light and transmission light. As can be seen from the graph of FIG. 2, the twist angle preferably takes a value of not greater than 15 degrees.

Regarding the product of a birefringence of liquid crystal layer and a gap formed by a liquid crystal layer, when referring to the graph of how the intensity of reflected light changes with the gap formed by a liquid crystal layer, the product of a birefringence of liquid crystal layer and a gap formed by a liquid crystal layer preferably takes values allowing the intensity of reflected light to become not less than 90% of the maximum intensity, reached when the gap equals $\lambda/4$, of reflected light. As can be seen from the graph of FIG. 3, the product of a birefringence of liquid crystal layer and a gap formed by a liquid crystal layer preferably takes a value represented by $(\lambda/4)\times(1\pm0.29)$. Furthermore, since the product, maximizing the intensity of transmission light, of a birefringence of liquid crystal layer and a gap formed by a liquid crystal layer equals two times the product, maximizing the intensity of reflected light, of a birefringence of liquid crystal layer and a gap formed by a liquid crystal layer, it should be understood that the product, maximizing the intensity of transmission light, of a birefringence of liquid crystal layer and a gap formed by a liquid crystal layer preferably takes a value represented by $2.\text{times}.(\lambda/4)\times(1\pm0.29)$. When assuming $\lambda$ represents the wavelength of green color, $\lambda=0.55$ $\mu$m and therefore it is to be understood that the product of a birefringence of liquid crystal layer and a gap formed by a liquid crystal layer in the reflective region preferably takes a value of 0.098 $\mu$m to 0.178 $\mu$m, which value is calculated using $(\lambda/4)\times(1\pm0.29)$. In addition, it is to be understood that the product of a birefringence of liquid crystal layer and a gap formed by a liquid crystal layer in the transmissive region preferably takes a value of 0.195 $\mu$m to 0.355 $\mu$m, which value is calculated using $2.\text{times}.(\lambda/4)\times(1\pm0.29)$.

According to the invention, disposing a one-half wavelength plate between a lower substrate and a polarizer positioned on the side of the lower substrate provides a semi-transmissive liquid crystal display device comprising a reflective region and a transmissive region, in which at least the transmissive region is configured to have liquid crystal molecules driven by a horizontal electric field and the device operates in a normally-black mode both in the reflective and transmissive regions. As a result, a semi-transmissive liquid crystal display device having wide viewing angle characteristics can be achieved.

Specifically, since the device operates in a normally-black mode in both its reflective and transmissive regions by making both the reflective and transmissive regions have liquid crystal molecules driven by a horizontal electric field, the device eliminates the problem of a defective display which occurs at a boundary between the reflective region and the transmissive region, providing an improved and desirable display.

In this case, as can be seen from the description of the third embodiment, the reflector is formed in the reflective region and positioned nearer the alignment film on the side of the opposing substrate than the alignment film in the transmissive region on the side of the lower substrate, and therefore, almost all films can be formed through the same process steps to make the reflective region and the transmissive region have nearly the same film configuration.

Furthermore, as can be seen from the description of the fifth embodiment, when the device is constructed so that the transmissive region is made to have liquid crystal molecules driven by a horizontal electric field created in the reflective region, the number of electrodes used to generate a horizontal electric field and formed in the transmissive region can be reduced or electrodes used to generate a horizontal electric field may not be formed in the transmissive region, allowing for increase in the aperture ratio of the transmissive region.

What is claimed is:

1. A semi-transmissive liquid crystal display device comprising:

a pair of substrates disposed facing each other through a liquid crystal layer and defined as a lower substrate and an opposing substrate;

a plurality of pixel areas provided in one of said pair of substrates, each of said plurality of pixel areas having a reflective region and a transmissive region therein and further having an electrode configuration allowing electrodes to drive liquid crystal molecules with a horizontal electric field generated between said electrodes in said transmissive region; and a one-half wavelength plate provided on an area corresponding to said transmissive region;

wherein said reflective region has an electrode configuration allowing electrodes to drive liquid crystal molecules with a horizontal electric field generated between said electrodes in said reflective region; and wherein said electrodes used to generate a horizontal electric field and drive liquid crystal molecules with the horizontal electric field in said reflective region are transparent electrodes and formed in said reflective region.

2. The semi-transmissive liquid crystal display according to claim 1, wherein twist angles in said reflective region and said transmissive region are approximately the same.

3. The semi-transmissive liquid crystal display according to claim 1, wherein said reflective region has a reflector formed therein and said reflector is formed in a level positioned nearer an alignment film on a side of said opposing substrate than an alignment film formed in said transmissive region and located on a side of said lower substrate.

4. The semi-transmissive liquid crystal display according to claim 1, wherein said reflective region has an electrode configuration allowing electrodes to drive liquid crystal molecules with a horizontal electric field generated between said electrodes in said reflective region and further has at least one of a common electrode used to supply a reference potential and a pixel electrode corresponding to a pixel to be displayed.

5. A semi-transmissive liquid crystal display device comprising:
- a pair of substrates disposed facing each other through a liquid crystal layer and defined as a lower substrate and an opposing substrate;
- a plurality of pixel areas provided in one of said pair of substrates, each of said plurality of pixel areas having a reflective region and a transmissive region therein and further having an electrode configuration allowing electrodes to drive liquid crystal molecules with a horizontal electric field generated between said electrodes in said transmissive region; and
- a one-half wavelength plate provided on an area corresponding to said transmissive region;
- wherein said reflective region has an electrode configuration allowing electrodes to drive liquid crystal molecules with a horizontal electric field generated between said electrodes in said reflective region and wherein said reflective region and said transmissive region have said electrode configuration allowing a common electrode and a pixel electrode to be formed in said reflective region and said transmissive region, respectively.

6. The semi-transmissive liquid crystal display according to claim 4, wherein at least one of a common electrode and a pixel electrode, both formed in said reflective region, is a reflecting electrode.

7. A semi-transmissive liquid crystal display device comprising:
- a pair of substrates disposed facing each other through a liquid crystal layer and defined as a lower substrate and an opposing substrate;
- a plurality of pixel areas provided in one of said pair of substrates, each of said plurality of pixel areas having a reflective region and a transmissive region therein and further having an electrode configuration allowing electrodes to drive liquid crystal molecules with a horizontal electric field generated between said electrodes in said transmissive region; and
- a one-half wavelength plate provided on an area corresponding to said transmissive region;
- wherein said reflective region has an electrode configuration allowing electrodes to drive liquid crystal molecules with a horizontal electric field generated between said electrodes in said reflective region and further has at least one of a common electrode used to supply a reference potential and a pixel electrode corresponding to a pixel to be displayed, and wherein at least one of a common electrode and a pixel electrode, both formed in said reflective region, is a reflecting electrode, and wherein said common electrode is a reflecting electrode and formed in a level positioned nearer a liquid crystal layer than a data line and wherein said data line is covered through an insulation film with said common electrode formed wider than said data line.

8. The semi-transmissive liquid crystal display according to claim 6, A semi-transmissive liquid crystal display device comprising:
- a pair of substrates disposed facing each other through a liquid crystal layer and defined as a lower substrate and an opposing substrate;
- a plurality of pixel areas provided in one of said pair of substrates, each of said plurality of pixel areas having a reflective region and a transmissive region therein and further having electrode configuration allowing electrodes to drive liquid crystal molecules with a horizontal electric field generated between said electrodes in said transmissive region; and
- a one-half wavelength plate provided on an area corresponding to said transmissive region;
- wherein said reflective region has an electrode configuration allowing electrodes to drive liquid crystal molecules with a horizontal electric field generated between said electrodes in said reflective region and further has at least one of a common electrode used to supply a reference potential and a pixel electrode corresponding to a pixel to be displayed, and wherein at least one of a common electrode and a pixel electrode, both formed in said reflective region, is a reflecting electrode, and wherein said common electrode is a reflecting electrode and formed in a level positioned nearer a liquid crystal layer than a scanning line and wherein said scanning line is covered through an insulation film with said common electrode formed wider than said scanning line.

9. A semi-transmissive liquid crystal display device comprising:
- a pair of substrates disposed facing each other through a liquid crystal layer and defined as a lower substrate and an opposing substrate;
- a plurality of pixel areas provided in one of said pair of substrates, each of said plurality of pixel areas having a reflective region and a transmissive region therein and further having an electrode configuration allowing electrodes to drive liquid crystal molecules with a horizontal electric field generated between said electrodes in said transmissive region; and
- a one-half wavelength plate provided on an area corresponding to said transmissive region;
- wherein said reflective region has an electrode configuration allowing electrodes to drive liquid crystal molecules with a horizontal electric field generated between said electrodes in said reflective region and further has at least one of a common electrode used to supply a reference potential and a pixel electrode corresponding to a pixel to be displayed, and wherein at least one of a common electrode and a pixel electrode, both formed in said reflective region, is a reflecting electrode, and wherein said common electrode is a reflecting electrode and formed in a level positioned nearer a liquid crystal layer than a channel region of a thin film transistor and wherein said channel region is completely covered through an insulation film with said common electrode.

10. A semi-transmissive liquid crystal display device comprising:
- a pair of substrates disposed facing each other through a liquid crystal layer and defined as a lower substrate and an opposing substrate;
- a plurality of pixel areas provided in one of said pair of substrates, each of said plurality of pixel areas having a reflective region and a transmissive region therein and further having an electrode configuration allowing electrodes to drive liquid crystal molecules with a horizontal electric field generated between said electrodes in said transmissive region; and
- a one-half wavelength plate provided on an area corresponding to said transmissive region;

wherein said reflective region has an electrode configuration allowing electrodes to drive liquid crystal molecules with a horizontal electric field generated between said electrodes in said reflective region and further has at least one of a common electrode used to supply a reference potential and a pixel electrode corresponding to a pixel to be displayed, and wherein said common electrode is connected to common electrode interconnect line made of an opaque metal through a contact hole in each pixel and wherein said pixel electrode is connected to an auxiliary pixel electrode made of an opaque metal through a contact hole in each pixel.

11. The semi-transmissive liquid crystal display according to claim 4, wherein said common electrode and said pixel electrode are formed at the same level.

12. The semi-transmissive liquid crystal display according to claim 10, wherein said common electrode interconnect line and said auxiliary pixel electrode are formed to overlap each other while sandwiching an insulation film therebetween.

13. The semi-transmissive liquid crystal display according to claim 10, wherein at least a part of said auxiliary pixel electrode is formed below said pixel electrode formed at the same level as said common electrode and in a comb shape.

14. The semi-transmissive liquid crystal display according to claim 2, wherein said twist angle is not greater than 15 degrees.

15. The semi-transmissive liquid crystal display according to claim 2, wherein product of a birefringence of liquid crystal layer and a gap formed by a liquid crystal layer in said reflective region takes a value of 0.098 $\mu$m to 0.178 $\mu$m.

16. The semi-transmissive liquid crystal display according to claim 2, wherein product of a birefringence of liquid crystal layer and a gap formed by a liquid crystal layer in said transmissive region takes a value of 0.195 $\mu$m to 0.355 $\mu$m.

* * * * *